US010209731B2

(12) United States Patent
Kiuchi

(10) Patent No.: US 10,209,731 B2
(45) **Date of Patent: *Feb. 19, 2019**

(54) BANDGAP REFERENCE CIRCUIT AND POWER SUPPLY CIRCUIT

(71) Applicant: Renesas Electronics Corporation, Tokyo (JP)

(72) Inventor: Hideki Kiuchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/851,205

(22) Filed: Dec. 21, 2017

(65) Prior Publication Data

US 2018/0113485 A1 Apr. 26, 2018

Related U.S. Application Data

(63) Continuation of application No. 15/173,304, filed on Jun. 3, 2016, now Pat. No. 9,891,647, which is a (Continued)

(30) Foreign Application Priority Data

Nov. 16, 2011 (JP) ................................ 2011-250925

(51) Int. Cl.
*G06F 3/08* (2006.01)
*G05F 3/08* (2006.01)
(Continued)

(52) U.S. Cl.
CPC .................. *G05F 3/08* (2013.01); *G05F 3/30* (2013.01); *G05F 3/267* (2013.01)

(58) Field of Classification Search
CPC .......... G05F 3/262; G05F 3/265; G05F 1/575; G05F 3/267; G05F 3/22; G05F 3/30; H03K 17/603
See application file for complete search history.

(56) References Cited

U.S. PATENT DOCUMENTS 3,887,863 A 6/1975 Brokaw
4,677,368 A 6/1987 Bynum
(Continued)

FOREIGN PATENT DOCUMENTS

EP 0264563 A1 8/1987
GB 2 199 677 A 7/1988
(Continued)

OTHER PUBLICATIONS

Notice of Allowance dated May 18, 2016 in U.S. Appl. No. 13/665,641.

(Continued)

*Primary Examiner* — Emily P Pham
*Assistant Examiner* — Shehzeb K Ahmad
(74) *Attorney, Agent, or Firm* — McGinn I.P. Law Group, PLLC

(57) ABSTRACT

A band gap reference circuit includes a first bipolar transistor and a second bipolar transistor that are coupled to a first power supply terminal and a second power supply terminal, each base of the first bipolar transistor and the second bipolar transistor being coupled to an output terminal, a first resistor that is coupled to the second power supply terminal and the first bipolar transistor, a second resistor and a third resistor that are coupled to an end of the first bipolar transistor of the first resistor and the second bipolar transistor in series, a ninth resistor that is coupled to the first power supply terminal and a collector of the first bipolar transistor, a tenth resistor that is coupled to the first power supply terminal and a collector of the second bipolar transistor, and an amplifier is coupled to the collector of the first bipolar transistor.

20 Claims, 25 Drawing Sheets

Related U.S. Application Data continuation of application No. 13/665,641, filed on Oct. 31, 2012, now Pat. No. 9,367,077.

(51) Int. Cl.
*G05F 3/30* (2006.01)
*G05F 3/26* (2006.01)

(56) References Cited

U.S. PATENT DOCUMENTS

| | | | | |
|---|---|---|---|---|
| 4,683,416 | A | 7/1987 | Bynum | |
| 5,774,013 | A | 6/1998 | Groe | |
| 6,118,264 | A | 9/2000 | Capici | |
| 6,232,828 | B1 | 5/2001 | Smith et al. | |
| 6,642,699 | B1 | 11/2003 | Gregoire, Jr. | |
| 6,677,808 | B1 | 1/2004 | Sean | |
| 7,420,359 | B1 | 9/2008 | Anderson et al. | |
| 7,728,575 | B1 | 6/2010 | Ozalevli et al. | |
| 8,159,206 | B2 | 4/2012 | Chao | |
| 8,493,130 | B2 | 7/2013 | Fukazawa | |
| 8,736,354 | B2 | 5/2014 | Ivanov et al. | |
| 2005/0077952 | A1 * | 4/2005 | Okada | G05F 3/30 327/539 |
| 2009/0108918 | A1 | 4/2009 | Chellappa | |
| 2011/0248772 | A1 | 10/2011 | Neidorff | |
| 2013/0106390 | A1 | 5/2013 | Wadhwa | |

FOREIGN PATENT DOCUMENTS

| | | | |
|---|---|---|---|
| JP | S 59-189421 | A | 10/1984 |
| WO | WO 2011/037693 | A1 | 3/2011 |

OTHER PUBLICATIONS

Final Office Action dated Nov. 2, 2015 U.S. Appl. No. 13/665,641.
Non-Final Office Action dated Apr. 24, 2015 in U.S. Appl. No. 13/665,641.
Japanese Office Action dated Apri. 12, 2016 with an English translation thereof.
Chinese Office Action dated Apr. 22, 2015 with an English translation thereof.
Non-Final Office Action dated Apr. 7, 2017 in U.S. Appl. No. 15/173,304.
Final Office Action dated Jul. 26, 2017 in U.S. Appl. No. 15/173,304.
Notice of Allowance dated Oct. 10, 2017 in U.S. Appl. No. 15/173,304.
Extended European Search Report dated Oct. 2, 2017 in European Application No. 12191954.2.

* cited by examiner

BANDGAP REFERENCE CIRCUIT AND POWER SUPPLY CIRCUIT

CROSS-REFERENCE TO RELATED APPLICATIONS

The present application is a Continuation Application of U.S. patent application Ser. No. 15/173,304, filed on Jun. 3, 2016, which is a Continuation Application of U.S. patent application Ser. No. 13/665,641, filed on Oct. 31, 2012, now U.S. Pat. No. 9,367,077, issued on Jun. 14, 2016, which is based on Japanese Patent Application No. 2011-250925, filed on Nov. 16, 2011, the entire contents of which are hereby incorporated by reference.

BACKGROUND

The present invention relates to a bandgap reference circuit and a power supply circuit, and more specifically, to a bandgap reference circuit and a power supply circuit that correct temperature characteristics.

In recent years, hybrid cars and electric vehicles have become popular, and more and more vehicles are loaded with batteries in order to obtain electric power. Such a vehicle typically uses an assembled battery including a large number of battery cells connected in series in order to obtain high voltage. The voltages of the battery cells of the assembled battery fluctuate according to use conditions of the vehicle, as is similar to gasoline in gasoline cars. Accordingly, a system for monitoring voltages is necessary to monitor the status of the battery cells.

A voltage to be monitored is input to a voltage monitoring system as an analog signal. The voltage monitoring system performs analog to digital conversion (hereinafter referred to as AD conversion) to convert the analog signal to a digital signal. Therefore, an analog to digital converter (hereinafter referred to as ADC) is included in the voltage monitoring system and an apparatus or a circuit in the voltage monitoring system.

For the safe travelling of hybrid cars or electric vehicles, it is required to monitor the output voltage of the assembled battery with high accuracy. Therefore, an increase in the accuracy of the AD conversion by the ADC is required. In order to increase the accuracy of the AD conversion by the ADC, it is required to suppress fluctuations in the reference voltage supplied to the ADC. Accordingly, a bandgap reference circuit (hereinafter referred to as BGR) with little voltage fluctuation is used as a reference voltage source.

Hereinafter, a typical BGR (specification of U.S. Pat. No. 3,887,863) will be described. FIG. 24 is a circuit diagram showing a configuration of a typical BGR circuit 1100. The BGR circuit 1100 is a BGR circuit which is generally called a Brokaw cell. The BGR circuit 1100 includes resistors RL101 and RL102, bipolar transistors Q101 and Q102, resistors R101 and R102, and an amplifier AMP.

The resistor RL101 is connected between a power supply terminal that supplies a power supply voltage VDD (hereinafter referred to as a power supply terminal VDD) and the collector of the bipolar transistor Q101. The resistor R101 is connected between the emitter of the bipolar transistor Q101 and a power supply terminal that supplies a ground voltage GND (hereinafter referred to as a ground terminal GND). The base of the bipolar transistor Q101 is connected to an output terminal $T_{OUT}$.

The resistor RL102 is connected between the power supply terminal VDD and the collector of the bipolar transistor Q102. The resistor R102 is connected between the emitter of the bipolar transistor Q102 and the emitter of the bipolar transistor Q101. The base of the bipolar transistor Q102 is connected to the output terminal $T_{OUT}$.

The non-inverting input of the amplifier AMP is connected to the collector of the bipolar transistor Q101, and the inverting input of the amplifier AMP is connected to the collector of the bipolar transistor Q102. The output of the amplifier AMP is connected to the output terminal $T_{OUT}$.

Note that the bipolar transistor Q101 and the bipolar transistor Q102 have different sizes. In this example, the area ratio of the bipolar transistor Q101 to the bipolar transistor Q102 is 1:N. Accordingly, the bipolar transistor Q101 and the bipolar transistor Q102 have different current densities during operation. In summary, the current density $J_{101}$ of the bipolar transistor Q101 and the current density $J_{102}$ of the bipolar transistor Q102 satisfy $$\frac{J_{102}}{J_{101}} = N \tag{1}$$

the relation shown below in formula (1).

Subsequently, an operation of the BGR circuit 1100 will be described. In the following description, the base-to-emitter voltages of the bipolar transistors Q101 and Q102 are denoted by $V_{BE1}$ and $V_{BE2}$, respectively. As shown in FIG. 24, a current I1 flows through the bipolar transistor Q101, and a current I2 flows through the bipolar transistor Q102 and the resistor R102. A current I flows through the resistor R101. In this case, an output voltage $V_{BGR}$ that appears in the output terminal $T_{OUT}$ is expressed as the following formula (2).

$$V_{BGR}=V_{BE1}+R101\cdot I \tag{2}$$

The base-to-emitter voltage $V_{BE1}$ of the bipolar transistor Q101 can be expressed by the following formula (3).

$$V_{BE1}=V_{BE2}+R102\cdot I2 \tag{3}$$

Solving formula (3) for the current I2 yields the following formula (4).

$$I2 = \frac{V_{BE1} - V_{BE2}}{R102} \tag{4}$$

Further, $(V_{BE1}-V_{BE2})=\Delta V_{BE}$ is expressed by the following formula (5). Note that K is Boltzmann constant, q is the charge of an $$\Delta V_{BE} = \frac{KT}{q}\ln\left(\frac{J_{102}}{J_{101}}\right) \tag{5}$$

electron, and T is absolute temperature.

Using formula (1), formula (5) can be rewritten into the following formula (6).

$$\Delta V_{BE} = \frac{KT}{q}\ln(N) \tag{6}$$

Substituting formula (6) into formula (4) yields the following formula (7).

$$I2 = \frac{KT}{q \cdot R102}\ln(N) \tag{7}$$

The BGR circuit 1100 operates so that the current I1 becomes equal to the current I2. When I1=I2, the following formula (8) is established.

$$I=2 \cdot I2 \tag{8}$$

From formulae (2), (7), and (8), the following formula (9) can be obtained.

$$V_{BGR} = V_{BE1} + 2 \cdot \frac{R101}{R102} \cdot \frac{KT}{q}\ln(N) \tag{9}$$

The BGR circuit 1100 is able to correct temperature dependencies of bipolar transistors. Based on formula (9), the temperature dependencies of the bipolar transistors appear as fluctuations in $V_{BE1}$ due to temperature changes. The second term of the right side of formula (9) is a term which indicates the effect of correcting fluctuations in $V_{BE1}$. In summary, the second term of the right side of formula (9) having a positive temperature coefficient acts on the base-to-emitter voltage $V_{BE1}$ of the bipolar transistor Q101 having a negative temperature coefficient, thereby being able to correct the temperature dependencies of the output voltage $V_{BGR}$.

Various other BGR circuits have been proposed. The specification of U.S. Pat. No. 7,420,359 discloses a method of referring an output voltage of a BGR circuit to supply a signal according to the reference result to the BGR circuit, thereby correcting the output voltage of the BGR circuit. The specification of U.S. Pat. No. 6,642,699 discloses a BGR circuit that compensates temperature characteristics using a differential pair. The specification of U.S. Pat. No. 6,118,264 discloses a method of adding a correction voltage to an output voltage of a BGR circuit, to compensate the output voltage of the BGR circuit.

SUMMARY

However, the present inventors have found that the BGR circuit stated above has the following drawbacks. FIG. 25 is a graph showing temperature characteristics of the output voltage $V_{BGR}$ of the typical BGR circuit 1100. It is known that the BGR circuit 1100 has curved temperature characteristics in which the output voltage $V_{BGR}$ is shown by a curved line L10 having an upwardly convex shape, with a vertex of a certain temperature. In this example, the temperature at which the curved line L10 indicating the temperature characteristics of the output voltage $V_{BGR}$ of the BGR circuit 1100 indicates the maximum value is denoted by Ts.

In the BGR circuit which supplies the reference voltage to the ADC included in the voltage monitoring system of the assembled battery used in the electric vehicle or the hybrid car, as described above, it is required to control the output voltage with high accuracy. From recent situations in which electric vehicles and hybrid cars have become popular, it is expected that the demands for improving the accuracy of controlling the output voltage of the BGR circuit will be stronger. Accordingly, in order to further improve temperature dependencies of the output voltage of the BGR circuit, it is required to further flatten the curved temperature characteristics shown in FIG. 25.

One aspect of the present invention is a bandgap reference circuit including: a first bipolar transistor and a second bipolar transistor that are connected between a first power supply terminal and a second power supply terminal, each base of the first bipolar transistor and the second bipolar transistor being connected to an output terminal; a first resistor that is connected between the second power supply terminal and the first bipolar transistor; a second resistor and a third resistor that are connected in series between an end of the first bipolar transistor of the first resistor and the second bipolar transistor; and a first temperature correction circuit that is connected between the second power supply terminal and a node between the second resistor and the third resistor, in which the first temperature correction circuit includes: a first transistor that is connected between the second power supply terminal and the node between the second resistor and the third resistor, the base of the first transistor being connected to the end of the first bipolar transistor of the first resistor; and a fourth resistor that is connected in series between the first transistor and the second power supply terminal. According to this bandgap reference circuit, the temperature correction circuit 10 is able to supply a correction amount having a positive temperature coefficient to the base-to-emitter voltage of the first bipolar transistor having a negative temperature coefficient. Accordingly, it is possible to suppress fluctuations in the output voltage which depends on the base-to-emitter voltage of the first bipolar transistor output to the output terminal.

According to the present invention, it is possible to provide a bandgap reference circuit and a power supply circuit that are capable of correcting temperature characteristics of an output voltage and suppressing fluctuations in the output voltage.

BRIEF DESCRIPTION OF THE DRAWINGS

The above and other aspects, advantages and features will be more apparent from the following description of certain embodiments taken in conjunction with the accompanying drawings, in which:

FIG. 1 is a block diagram showing a configuration of a voltage monitoring system VMS for monitoring an output voltage of an assembled battery that supplies power to an electric vehicle or the like;

DETAILED DESCRIPTION

Hereinafter, with reference to the drawings, embodiments of the present invention will be described. Throughout the drawings, the same components are denoted by the same reference symbols, and overlapping description will be omitted as appropriate.

Figure 1:
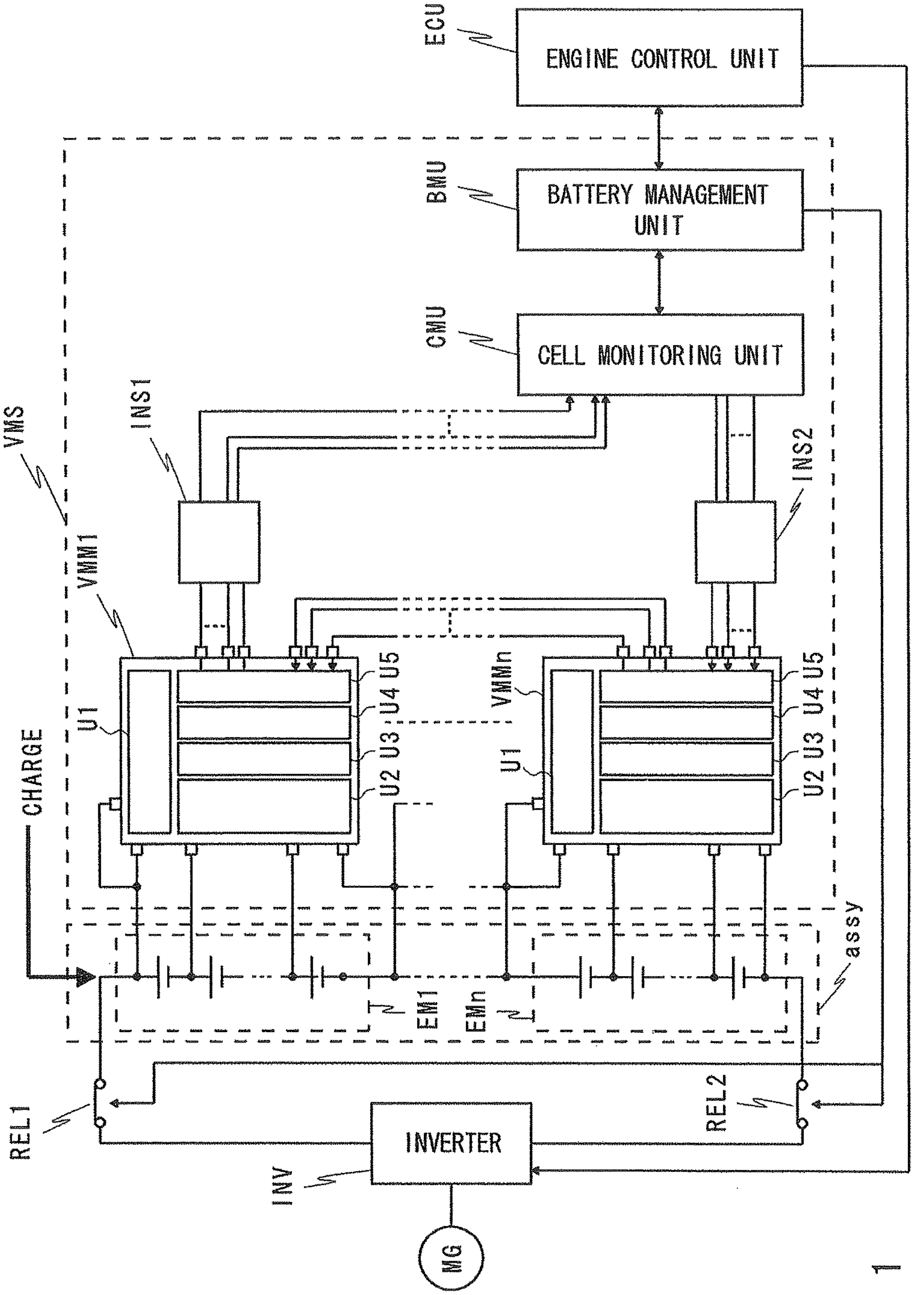

For the sake of understanding of embodiments of the present invention, description will be first made of a voltage monitoring system that monitors an output voltage of an assembled battery which supplies power to an electric vehicle or the like. First, referring to FIG. 1, the outline of a configuration of a voltage monitoring system VMS for monitoring an output voltage of an assembled battery that supplies power to an electric vehicle or the like is described. FIG. 1 is a block diagram showing a configuration of the voltage monitoring system VMS for monitoring the output voltage of the assembled battery that supplies power to the electric vehicle or the like. The voltage monitoring system VMS includes voltage monitoring modules VMM1-VMMn (n is an integer of two or larger), insulating elements INS1 and INS2, a cell monitoring unit CMU, and a battery management unit BMU. The cell monitoring unit CMU and the battery management unit BMU are micro computing units (MCUs), for example. Each of the voltage monitoring modules VMM1-VMMn has a power supply circuit U1, a cell balance circuit U2, a voltage measurement circuit U3, a control circuit U4, a communication circuit U5.

The voltage monitoring system VMS monitors the voltage of an assembled battery assy by the voltage monitoring modules VMM1-VMMn. The assembled battery assy includes n pieces of battery modules EM1-EMn that are connected in series. Each of the battery modules EM1-EMn includes m (m is an integer of two or larger) pieces of battery cells that are connected in series. In summary, in the assembled battery assy, (m×n) pieces of battery cells are connected in series. Accordingly, the assembled battery assy is able to obtain a high output voltage.

The cell monitoring unit CMU is connected to a communication input terminal of the voltage monitoring module VMMn via the insulating element INS2, and is connected to a communication output terminal of the voltage monitoring module VMM1 via the insulating element INS1. The insulating elements INS1 and INS2 are photo couplers, for example, and electrically separate the voltage monitoring modules VMM1-VMMn from the cell monitoring unit CMU. This makes it possible to prevent damage to the cell monitoring unit CMU caused by the application of a high voltage from the assembled battery assy to the cell monitoring unit CMU upon occurrence of a failure or the like.

The cell monitoring unit CMU is further connected to the battery management unit BMU. The cell monitoring unit CMU calculates an output voltage of each of the battery cells from the voltage monitoring results obtained by the voltage monitoring modules VMM1-VMMn, to notify the battery management unit BMU of the calculation results. Further, the cell monitoring unit CMU controls operations of the voltage monitoring modules VMM1-VMMn according to a command output from the battery management unit BMU. The battery management unit BMU is further connected to an engine control unit (ECU). The battery management unit BMU controls an operation of the voltage monitoring system VMS according to the output voltage of each of the battery cells notified from the cell monitoring unit CMU and a command output from the engine control unit ECU. Further, the battery management unit BMU notifies the engine control unit ECU of information regarding each status of the voltage monitoring system VMS, the assembled battery assy and the like. Operations of the cell monitoring unit CMU and the battery management unit BMU will be described in detail in the description of the operation of the voltage monitoring system VMS explained below.

Figure 2:
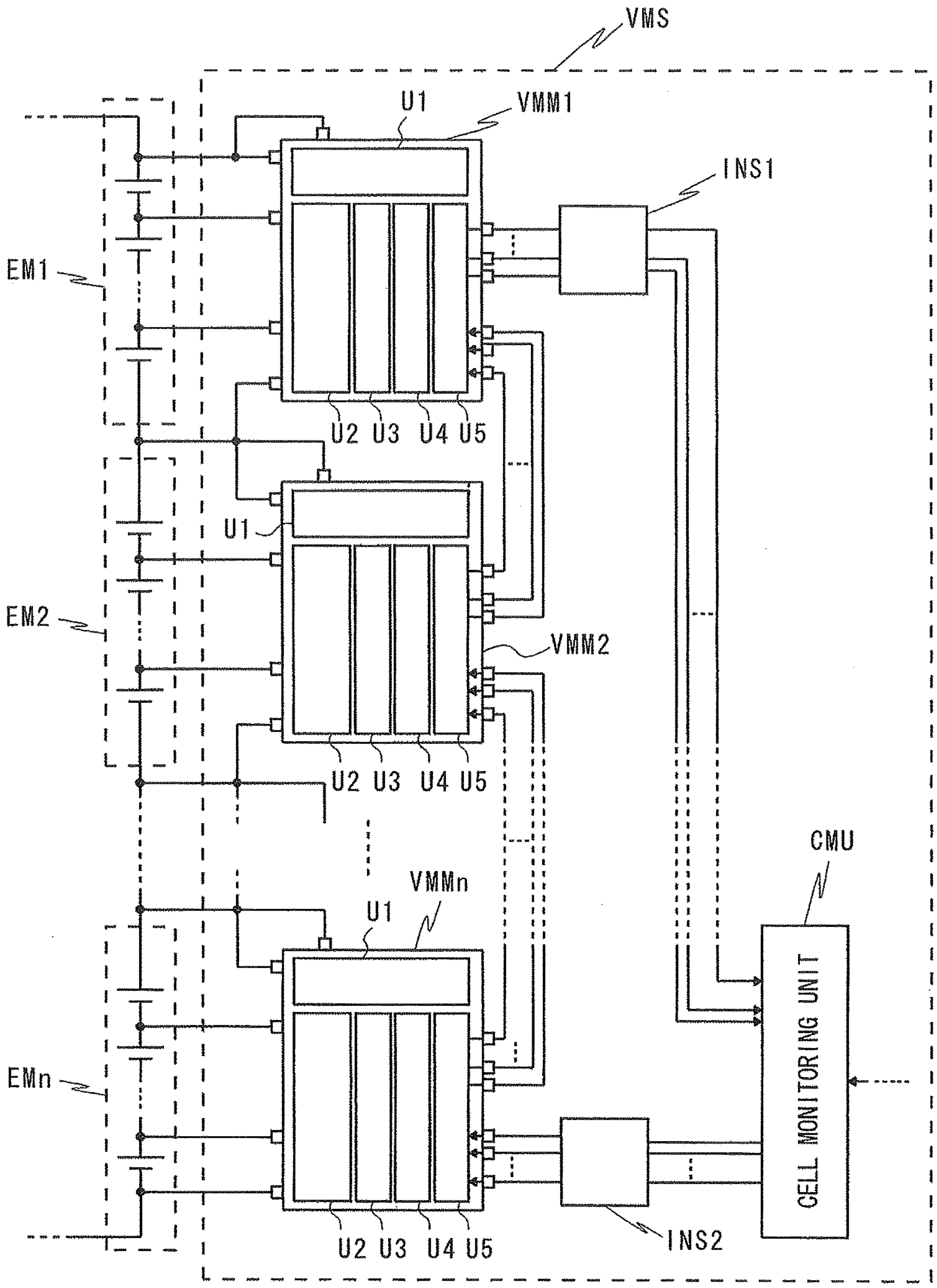
FIG. 2 is a block diagram of main parts of the voltage monitoring system VMS showing a connection relation of a cell monitoring unit CMU and voltage monitoring modules VMM1-VMMn.

Next, referring to FIG. 2, the connection relation between the voltage monitoring modules VMM1-VMMn and the cell monitoring unit CMU will be described. FIG. 2 is a block diagram of main parts of the voltage monitoring system VMS showing the connection relation between the voltage monitoring modules VMM1-VMMn and the cell monitoring unit CMU. The voltage monitoring modules VMM1-VMMn are connected to the battery modules EM1-EMn, respectively, and monitor voltages received from the battery modules EM1-EMn, respectively. The voltage monitoring modules VMM1-VMMn are daisy-chain-connected, and outputs of communication circuits U5 of the voltage monitoring modules VMM2-VMMn are connected to inputs of communication circuits U5 of the voltage monitoring modules VMM1-VMM(n−1), respectively.

The cell monitoring unit CMU outputs a control signal to the voltage monitoring module VMMn via the insulating element INS2. A control signal to the voltage monitoring modules VMM1-VMM(n−1) is transmitted to the voltage monitoring modules VMM1-VMM(n−1) using the daisy chain configuration. In this way, the cell monitoring unit CMU controls the operations of the voltage monitoring modules VMM1-VMMn. The voltage monitoring modules VMM1-VMMn output the monitoring results to the cell monitoring unit CMU via the insulating element INS1 according to the control signal output from the cell monitoring unit CMU. The monitoring results from the voltage monitoring modules VMM2-VMMn are transmitted to the cell monitoring unit CMU using the daisy chain configuration.

Figure 3:
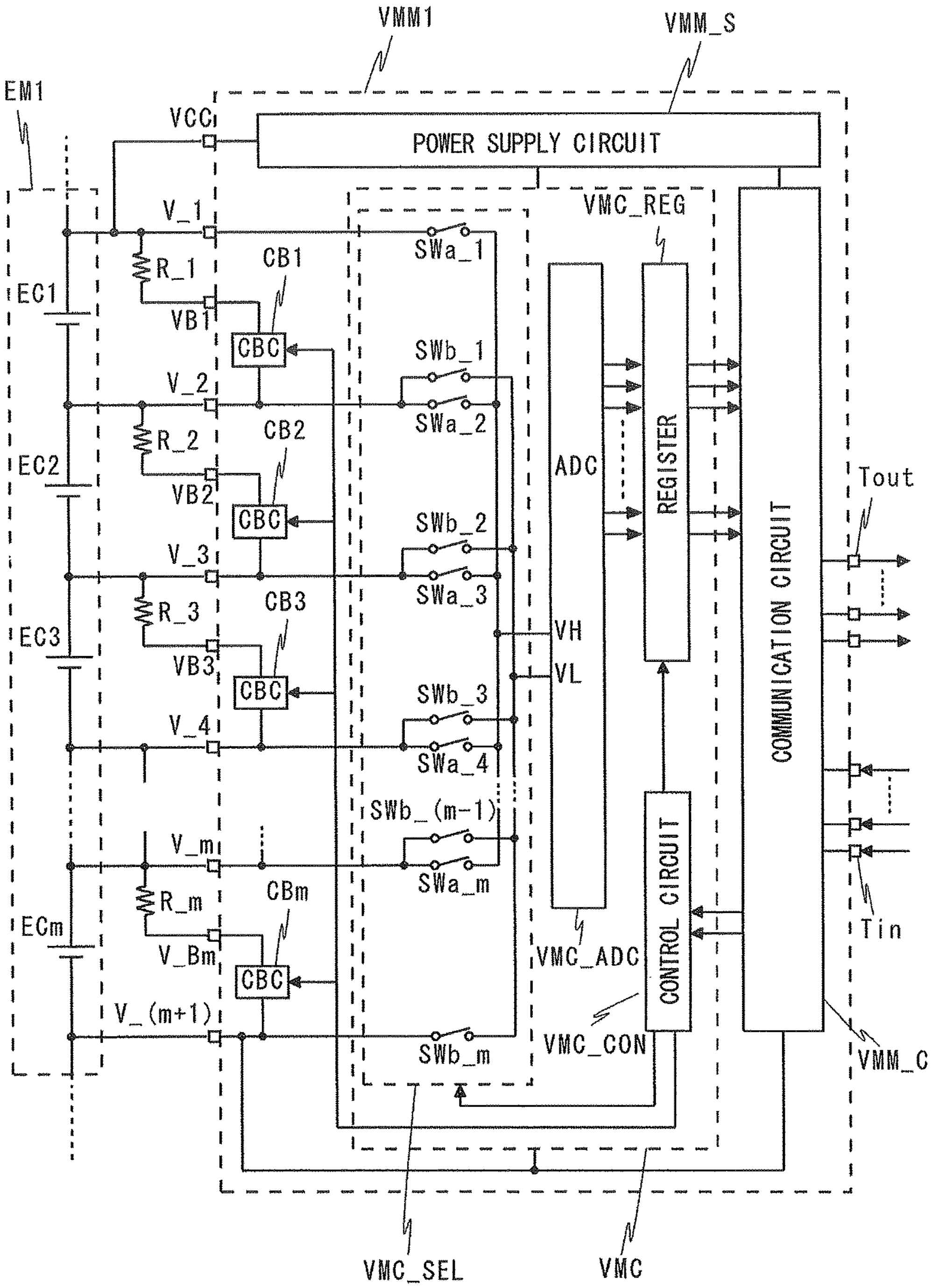
FIG. 3 is a block diagram showing a configuration of the voltage monitoring module VMM1.

Next, the configuration of each of the voltage monitoring modules VMM1-VMMn will be described. The voltage monitoring modules VMM-VMMn have the similar configuration. Therefore, with reference to FIG. 3, the configuration of the voltage monitoring module VMM1 will be described as a representative example. FIG. 3 is a block diagram showing the configuration of the voltage monitoring module VMM1. The voltage monitoring module VMM includes a power supply circuit VMM_S, a communication circuit VMM_C, a voltage measurement circuit VMC, cell balance circuits CB1-CBm (m is an integer of two or larger), a power supply terminal VCC, input terminals V_1-V_(m+1), cell balance input terminals VB1-VBm, a communication input terminal Tin, and a communication output terminal Tout. The power supply circuit VMM S corresponds to the power supply circuit U1. The cell balance circuits CB1-CBm correspond to the cell balance circuit U2. The voltage measurement circuit VMC corresponds to the voltage measurement circuit U3. The communication circuit VMM C corresponds to the communication circuit U5.

The battery module EM1 includes battery cells EC1-ECm connected in series in this order from the high-voltage side. In the voltage monitoring module VMM1, the power supply terminal VCC is connected to the high-voltage side of the battery cell EC1. The low-voltage side of the battery cell ECm is connected to the input terminal V_(m+1). The voltage of the input terminal V_(m+1) is divided in the voltage monitoring module VMM1, and supplied to the voltage measurement circuit VMC and the communication circuit VMM_C as the ground voltage. Accordingly, the output voltage from the battery module EM1 is supplied to the voltage monitoring module VMM1 as the power supply voltage. The power supply circuit VMM_S receives power supply from the battery cell EC1 via the power supply terminal VCC. The power supply circuit VMM_S supplies power to the communication circuit VMM_C and the voltage measurement circuit VMC.

The voltage measurement circuit VMC includes a selection circuit VMC_SEL, an A/D converter (Analog to Digital Converter: ADC) VMC_ADC, a register VMC_REG, and a control circuit VMC_CON. The control circuit VMC CON corresponds to the control circuit U4. The selection circuit VMC_SEL includes switches SWa_1-SWa_m and SWb_1-SWb_m. The switches SWa_1-SWa_m and SWb_1-SWb_m are turned on or off by a control signal output from the control circuit VMC_CON. Assuming that j is an integer from 1 to m, when the voltage of the battery cell ECj is measured, the switches SWa_j and SWb_j are simultaneously turned on. Then, the voltage from the high-voltage side terminal of the battery cell ECj is supplied to the A/D converter VMC_ADC as a high-voltage side voltage VH via the input terminal V_j. In the similar way, the voltage from the low-voltage side terminal of the battery cell ECj is supplied to the A/D converter VMC_ADC as a low-voltage side voltage VL via the input terminal V_(j+1).

The A/D converter VMC_ADC converts the values of the high-voltage side voltage VH and the low-voltage side voltage VL into voltage values that are digital values. The A/D converter VMC_ADC then outputs the voltage values that are digital values to the register VMC_REG. The register VMC_REG stores the voltage values output from the A/D converter VMC_ADC. The control circuit VMC_CON repeats the operation of turning on the switches SWa_1-SWa_m and SWb_1-SWb_m in order for every predetermined time interval (e.g., 10 msec). Accordingly, the values of the voltages supplied to the input terminals V_j and V_(j+1) are overwritten into the register VMC_REG for every predetermined time interval.

The communication circuit VMM_C receives the command output from the cell monitoring unit CMU and the outputs from other voltage monitoring modules VMM2-VMMn via the communication input terminal Tin. Then the communication circuit VMM_C transfers the command output from the cell monitoring unit CMU to the control circuit VMC_CON. The communication circuit VMM_C directly transfers the outputs from the voltage monitoring modules VMM2-VMMn to the cell monitoring unit CMU.

The cell balance circuit CBj and an external resistor R_j are connected between the input terminal V_j and the input terminal V_(j+1) via the cell balance input terminal VBj. When the cell balance circuit CBj is turned on, the input terminal V_j and the input terminal V_(j+1) are conducted. The control circuit VMC_CON controls ON/OFF of each of the cell balance circuits CB1-CBm, whereby each of the battery cells EC1-ECm is selectively discharged.

Subsequently, with reference to FIG. 1, the operation of the voltage monitoring system VMS will be described. First, an operation of monitoring the output voltages of the battery cells will be described. The voltage monitoring system VMS starts the operation of monitoring the output voltages of the battery cells according a command to start the voltage monitoring operation output from the cell monitoring unit CMU. For example, the engine control unit ECU detects power-on of the electric vehicle and issues a command to start the voltage monitoring system VMS to the battery management unit BMU. The battery management unit BMU issues a command to start the voltage monitoring modules VMM1-VMMn to the cell monitoring unit CMU according to the command to start the voltage monitoring system VMS. The cell monitoring unit CMU issues the command to start the voltage monitoring operation to the voltage monitoring modules VMM1-VMMn according to the command to start the voltage monitoring modules VMM1-VMMn.

With reference to FIG. 3, operations of the voltage monitoring modules VMM1-VMMn will be described. The voltage monitoring modules VMM1-VMMn receiving the command to start the voltage monitoring operation perform the similar operation. In the following description, only the operation of the voltage monitoring module VMM1 will be described as a representative example. The voltage monitoring module VMM1 starts the voltage monitoring operation according to the command to start the voltage monitoring operation output from the cell monitoring unit CMU. Specifically, the communication circuit VMM_C transfers the command to start the voltage monitoring operation output from the cell monitoring unit CMU to the control circuit VMC_CON of the voltage measurement circuit VMC. The control circuit VMC_CON turns on the switches SWa_j and SWb_j according to the command to start the voltage monitoring operation. Then, the input terminals V_j and V_(j+1) are each connected to the A/D converter VMC_ADC. The A/D converter VMC_ADC coverts the magnitude of each of the voltages supplied to the input terminals V_j and V_(j+1) connected thereto into voltage values which are digital values, to write the voltage values into the register VMC_REG.

In this example, the control circuit VMC_CON turns on the switches SWa_1-SWa_m and SWb_1-SWb_m in order within a predetermined time period. Thus, the control circuit VMC_CON repeats the switching operation m times within the predetermined time period. The predetermined time period is, for example, 10 msec. In this case, the voltage monitoring module VMM1 measures the value of the voltage supplied to each of the input terminals V_j and V_(j+1) for every predetermined time interval (10 msec), to thereby sequentially overwrite the values into the register VMC_REG. The voltage monitoring module VMM1 continuously performs the voltage monitoring operation stated above unless there is a command output from the cell monitoring unit CMU.

When referring to the values of the output voltages of the battery cells in order to control the electric vehicle, the cell monitoring unit CMU issues a command to output the voltage value to the voltage monitoring module VMM1 according to a command output from the battery management unit BMU. The voltage monitoring module VMM1 outputs the voltage value of the input terminal that is specified to the cell monitoring unit CMU according to the command to output the voltage value. Specifically, the communication circuit VMM_C transfers the command to output the voltage value from the cell monitoring unit CMU to the control circuit VMC_CON of the voltage measurement circuit VMC. The control circuit VMC_CON issues the output command to the register VMC_REG according to the command to output the voltage value. In this case, the control circuit VMC_CON specifies, in the register VMC_REG, which voltage value of which input terminal to output. The register VMC_REG outputs the voltage value of the input terminal that is specified at the time of receiving the output command to the cell monitoring unit CMU via the communication circuit VMM_C according to the output command output from the control circuit VMC_CON.

The cell monitoring unit CMU calculates the output voltage of the battery cell ECj from the voltage values of the input terminals V_j and V_(j+1) received from the voltage monitoring module VMM1. For example, the cell monitoring unit CMU is able to calculate the output voltage of the battery cell EC1 from the difference in voltage between the input terminal V_1 and the input terminal V_2. Then, the cell monitoring unit CMU notifies the battery management unit BMU of the output voltage of the battery cell that is calculated according to the request from the battery management unit BMU.

When the electric vehicle is powered off, the engine control unit ECU detects power-off of the electric vehicle, and issues a command to stop the voltage monitoring system VMS to the battery management unit BMU. The battery management unit BMU issues a command to stop the voltage monitoring modules VMM1-VMMn to the cell monitoring unit CMU according to the command to stop the voltage monitoring system VMS. The cell monitoring unit CMU issues a command to stop the voltage monitoring operation to the voltage monitoring modules VMM1-VMMn according to the command to stop the voltage monitoring modules VMM1-VMMn. The voltage monitoring module VMM1 stops the voltage monitoring operation according to the command to stop the voltage monitoring operation output from the cell monitoring unit CMU. Specifically, the communication circuit VMM_C transfers the command to stop the voltage monitoring operation output from the cell monitoring unit CMU to the control circuit VMC_CON of the voltage measurement circuit VMC. The control circuit VMC_CON turns off all the switches SWa_1-SWa_m and SWb_1-SWb_m according to the command to stop the voltage monitoring operation. Accordingly, the voltage monitoring operation is stopped.

In the description above, the operation of monitoring voltages of the battery cells has been described. However, since the voltage monitoring system VMS is installed in an electric vehicle, for example, the voltage monitoring system VMS is required to perform the operation according to use conditions of the electric vehicle or the like. In the following description, the operations of the voltage monitoring system VMS according to use conditions of the electric vehicle will be described.

In order to continuously use the electric vehicle, it is required to charge the assembled battery assy in a charging station or the like. When the assembled battery assy is charged, the engine control unit ECU detects an operation by a driver including connection of a charge plug, to issue a charge command to charge the assembled battery assy to the battery management unit BMU. The battery management unit BMU opens relays REL1 and REL2 according to the charge command output from the engine control unit ECU. Then, the assembled battery assy and an inverter INV are electrically disconnected. In this state, an external charge voltage CHARGE is supplied to the assembled battery assy via the charge plug, for example, whereby the assembled battery assy is charged.

It is generally well known that, when a secondary battery such as a battery cell is overcharged or overdischarged, the life of the battery cell becomes short. Further, in a configuration like the assembled battery assy in which a plurality of battery cells are connected in series, manufacturing variations in the battery cells causes variations in voltage even when similar charge and discharge operations are performed. If charge and discharge operations of the assembled battery assy are repeated while leaving the variations, degradation, overcharging, or overdischarging occurs in only a specific battery cell. This reduces the life of the whole assembled battery assy and causes occurrence of a failure. Accordingly, when the battery cells connected in series are used, it is required to keep the balance of the voltage of each of the battery cells (so-called cell balance).

In the following description, operations of the battery cells of the voltage monitoring system VMS at the time of charging at a charging station or the like will be described. The operation of monitoring the output voltages of the battery cells and the method of calculating the output voltages of the battery cells are similar to those described above, and thus description will be omitted as appropriate.

First, the battery management unit BMU issues a command to measure output voltages to the cell monitoring unit CMU according to the charge command output from the engine control unit ECU. The cell monitoring unit CMU calculates the output voltages of all the battery cells forming the assembled battery assy according to the command to measure the output voltages from the battery management unit BMU, to notify the battery monitoring unit BMU of the calculation results. The battery management unit BMU specifies the battery cell having the lowest output voltage in the assembled battery assy. In this description, for the sake of simplification of description, it is assumed that the battery cell EC1 of the battery module EM1 has the lowest output voltage in the assembled battery assy.

Then, the battery management unit BMU issues a command to perform the cell balance operation to the cell monitoring unit CMU. The cell monitoring unit CMU issues a discharge command to the voltage monitoring modules VMM1-VMMn according to the command to perform the cell balance operation. In the following description, the operation of the voltage monitoring module VMM1 will be described as a representative example. In the voltage monitoring module VMM1, the control circuit VMC_CON of the voltage measurement circuit VMC receives the discharge command via the communication circuit VMM_C. The control circuit VMC_CON turns on the cell balance circuits CB2-CBm according to the discharge command. Accordingly, the battery cells EC2-ECm are discharged.

The cell monitoring unit CMU sequentially calculates the output voltage values of the battery cells EC2-ECm that are being discharged. When the output voltage of each of the battery cells is reduced to the output voltage of the battery cell EC1, a command to stop discharging is issued to stop the discharge operation of the corresponding battery cell. In the following description, a case will be described in which the output voltage of the battery cell EC2 is reduced to the output voltage of the battery cell EC1 due to discharging. First, the cell monitoring unit CMU detects that the output voltage of the battery cell EC2 is reduced to the output voltage of the battery cell EC1. Then, the cell monitoring unit CMU issues the command to stop discharging of the battery cell EC2 to the voltage monitoring module VMM1.

The control circuit VMC_CON of the voltage monitoring module VMM1 receives the command to stop discharging of the battery cell EC2 through the communication circuit VMM_C. The control circuit VMC_CON turns off the cell balance circuit CB2 according to the command to stop discharging of the battery cell EC2. Accordingly, discharging of the battery cell EC2 is stopped, and the output voltage of the battery cell EC2 becomes equal to the output voltage of the battery cell EC1. The cell monitoring unit CMU performs the similar operation, whereby the output voltage of each of the battery cells EC3-ECm of the battery module EM1 and the output voltage of each of the battery cells of the battery modules EM2-EMn become equal to the output voltage of the battery cell EC1. Accordingly, the output voltage of each of the battery cells of the battery modules EM2-EMn is equalized, and the cell monitoring unit CMU completes the cell balance operation. The cell monitoring unit CMU notifies the battery management unit BMU of completion of the cell balance operation.

The battery management unit BMU issues a command to start charging to a power receiving unit (not shown) connected to the charge plug according to the notification of completion of the cell balance operation. Accordingly, the external charge voltage CHARGE is supplied to the assembled battery assy, and charging of the assembled battery assy is started.

The cell monitoring unit CMU monitors the output voltage of each battery cell that is being charged. When the output voltage of any one of the battery cells reaches the charge upper limit voltage, the cell monitoring unit CMU issues an overcharge warning to the battery management unit BMU. The battery management unit BMU issues a command to stop charging to the power receiving unit according to the notification of the overcharge warning. Then, the supply of the external charge voltage CHARGE is interrupted, which stops charging. Preferably, the charge upper limit voltage is a voltage value which is smaller than the threshold voltage level of overcharging and has a sufficient margin from the voltage level at the time of overcharging in order to reliably prevent occurrence of overcharging of battery cells.

There are variations in charge characteristics of each battery cell of the voltage modules EM1-EMn. Therefore, there are generated variations in voltage value of each battery cell after charging. Therefore, in order to grasp variations in the voltage value of each battery cell, the cell monitoring unit CMU measures the output voltage of each battery cell. Then, it is determined whether the variations in the output voltage of each battery cell are within a specified range. Then, the determination results are sent to the battery management unit BMU.

When the variations in the output voltage of each battery cell are not within the specified range, the battery management unit BMU instructs the cell monitoring unit CMU to start the cell balance operation. After the cell balance operation is completed, the battery management unit BMU instructs the power receiving unit to start charging. On the other hand, when the variations in the output voltage of each battery cell are within the specified range, the battery management unit BMU notifies the engine control unit ECU of the charge completion. The engine control unit ECU displays in a display apparatus or the like provided in a driver's seat that charging of the assembled battery assy has been completed. As described above, the voltage monitoring system VMS monitors the output voltages of the battery cells, thereby being able to charge the assembled battery assy to the full charge state while preventing overcharging and keeping excellent cell balance.

Next, a case in which the electric vehicle is accelerated will be described. When the electric vehicle is accelerated, the engine control unit ECU detects an operation by the driver (e.g., pressing an accelerator pedal), to issue an acceleration command to accelerate the electric vehicle to the inverter INV and the battery management unit BMU. The inverter INV changes the operation mode of itself to the DC-to-AC conversion mode according to the acceleration command output from the engine control unit ECU. The battery management unit BMU closes the relays REL1 and REL2 according to the acceleration command output from the engine control unit ECU. Accordingly, a direct voltage is supplied from the assembled battery assy to the inverter INV. The inverter INV converts the direct voltage into an alternating voltage, which is then supplied to a motor generator MG. The motor generator MG receives supply of the alternating voltage, and generates a driving force. The driving force generated by the motor generator MG is transmitted to drive wheels via a drive shaft and the like, whereby the electric vehicle is accelerated.

When the electric vehicle is accelerated, power stored in the battery cells is consumed, and the output voltages of the battery cells are reduced. Accordingly, it is required to take any measure to prevent overdischarging of the battery cells. Therefore, the voltage monitoring system VMS constantly monitors the output voltage of each battery cell during travelling. For example, when the voltage of any battery cell is below the warning level voltage, the cell monitoring unit CMU issues a voltage decrease warning to the battery management unit BMU. The battery management unit BMU issues to the engine control unit ECU a warning to inform that the residual charge amount of the assembled battery assy is decreasing according to the voltage decrease warning. The engine control unit ECU displays, in a display apparatus or the like that is provided in a driver's seat, the warning to inform that the residual charge amount of the assembled battery assy is decreasing, to notify the driver that overdischarging of the battery cells may occur. Accordingly, the voltage monitoring system VMS is able to urge the driver to take any measure (e.g., stop travelling) to prevent overdischarging.

When the warning to inform that the residual charge amount of the assembled battery assy is decreasing is neglected and travelling is further continued, the output voltages of the battery cells are further reduced. Therefore, in order to prevent overdischarging of the battery cells, it is required to stop discharging of each battery cell. For example, when the voltage of any battery cell is lower than the emergency stop level voltage, the cell monitoring unit CMU issues an emergency stop warning to the battery management unit BMU. Preferably, the emergency stop level voltage is a voltage value which is larger than the threshold voltage level of overdischarging and has a sufficient margin from the voltage level at the time of overdischarging in order to reliably prevent occurrence of overdischarging of battery cells.

The battery management unit BMU starts an emergency stop action according to the emergency stop warning output from the cell monitoring unit CMU. Specifically, the battery management unit BMU opens the relays REL1 and REL2, and interrupts power supply from the assembled battery assy to the inverter INV. Then, the decrease in the output voltages of the battery cells stops. Further, the battery management unit BMU notifies the engine control unit ECU of execution of the emergency stop action. The engine control unit ECU displays in the display apparatus or the like provided in the driver's seat that the emergency stop action has been started. Accordingly, it is possible to reliably prevent occurrence of overdischarging of the battery cells.

Next, a case in which the electric vehicle is decelerated will be described. When the electric vehicle is decelerated, the engine control unit ECU detects an operation by the driver (e.g., pressing a brake pedal), for example, to issue a deceleration command to decelerate the electric vehicle to the inverter INV and the battery management unit BMU. The inverter INV changes the operation mode of itself to the AC-to-DC conversion mode according to the deceleration command output from the engine control unit ECU. The battery management unit BMU closes the relays REL1 and REL2 according to the deceleration command output from the engine control unit ECU. The motor generator MG generates electricity by a rotational force of tires transmitted via a drive shaft and the like. The rotation resistance generated by power generation is transmitted to drive wheels via the drive shaft and the like as a braking force. This decelerates the electric vehicle. This braking method is typically called a regeneration brake operation. The alternating voltage generated by the regeneration brake operation is supplied to the inverter INV. The inverter INV converts the alternating voltage from the motor generator MG into a direct voltage, which is then supplied to the assembled battery assy. Accordingly, the assembled battery assy is charged by the voltage recovered in the regeneration brake operation.

In the regeneration brake operation, the assembled battery assy is charged, which increases the output voltage of each battery cell. Therefore, it is required to take any measure to prevent overcharging of the battery cells. Accordingly, the voltage monitoring system VMS constantly monitors the output voltage of each battery cell during travelling. The cell monitoring unit CMU determines whether the output voltage of each battery cell at the time of start of the regeneration brake operation is equal to or lower than the charge upper limit voltage. When there is a battery cell whose output voltage is larger than the charge upper limit voltage, the cell monitoring unit CMU issues an overcharge warning to the battery management unit BMU. The battery management unit BMU opens the relays REL1 and REL2 according to the overcharge warning, to prevent the assembled battery assy from being charged.

Also during charging by the regeneration brake operation, the cell monitoring unit CMU continues to monitor the output voltages of the battery cells. When there is a battery cell whose output voltage has reached the charge upper limit voltage, the cell monitoring unit CMU issues the overcharge warning to the battery management unit BMU. The battery management unit BMU opens the relays REL1 and REL2 according to the overcharge warning, to prevent the assembled battery assy from being charged. In this way, it is possible to prevent overcharging of the assembled battery assy.

In the description above, the operation of the voltage monitoring system VMS has been described based on the situation in which the voltages of the battery cells can be normally detected. However, in reality, it may be possible that the output voltages of the battery cells cannot be normally detected. For example, when wiring between the voltage monitoring modules VMM1-VMMn and the assembled battery assy is disconnected, the voltage in the position where the disconnection occurs abnormally decreases or abnormally increases, and the cell monitoring unit CMU cannot normally calculate voltages. When such disconnection occurs, it is impossible to monitor the output voltages of the battery cells, which is an object of the voltage monitoring system VMS. In such a case, it is required to detect the disconnection failure.

In order to achieve this, the cell monitoring unit CMU stores the appropriate range of values of the output voltage in advance. When the output voltage value of the battery cell that is calculated is deviated from the appropriate range, the cell monitoring unit CMU determines that disconnection failure occurs. The cell monitoring unit CMU then notifies the battery management unit BMU of the occurrence of the disconnection failure. The battery management unit BMU opens the relays REL1 and REL2 according to the notification of the occurrence of the disconnection failure to disconnect the inverter INV from the assembled battery assy. This prevents occurrence of further failure in the system. Further, the battery management unit BMU notifies the engine control unit ECU of the occurrence of the disconnection failure. The engine control unit ECU displays the occurrence of the disconnection failure in the display apparatus or the like provided in the driver's seat, to notify the driver of the occurrence of the failure. In this way, the voltage monitoring system VMS is also able to detect the occurrence of the disconnection failure.

The configuration and the operation of the voltage monitoring system VMS are merely an example. Accordingly, for example, the cell monitoring unit CMU and the battery management unit BMU can be integrated into one circuit block. Further, a part or all of the functions of the cell monitoring unit CMU and the battery management unit BMU may be alternated with each other. Furthermore, the cell monitoring unit CMU, the battery management unit BMU, and the engine control unit ECU may be integrated into one circuit block. Further, the engine control unit ECU may perform a part or all of the functions of the cell monitoring unit CMU and the battery management unit BMU.

First Embodiment

Figure 4:
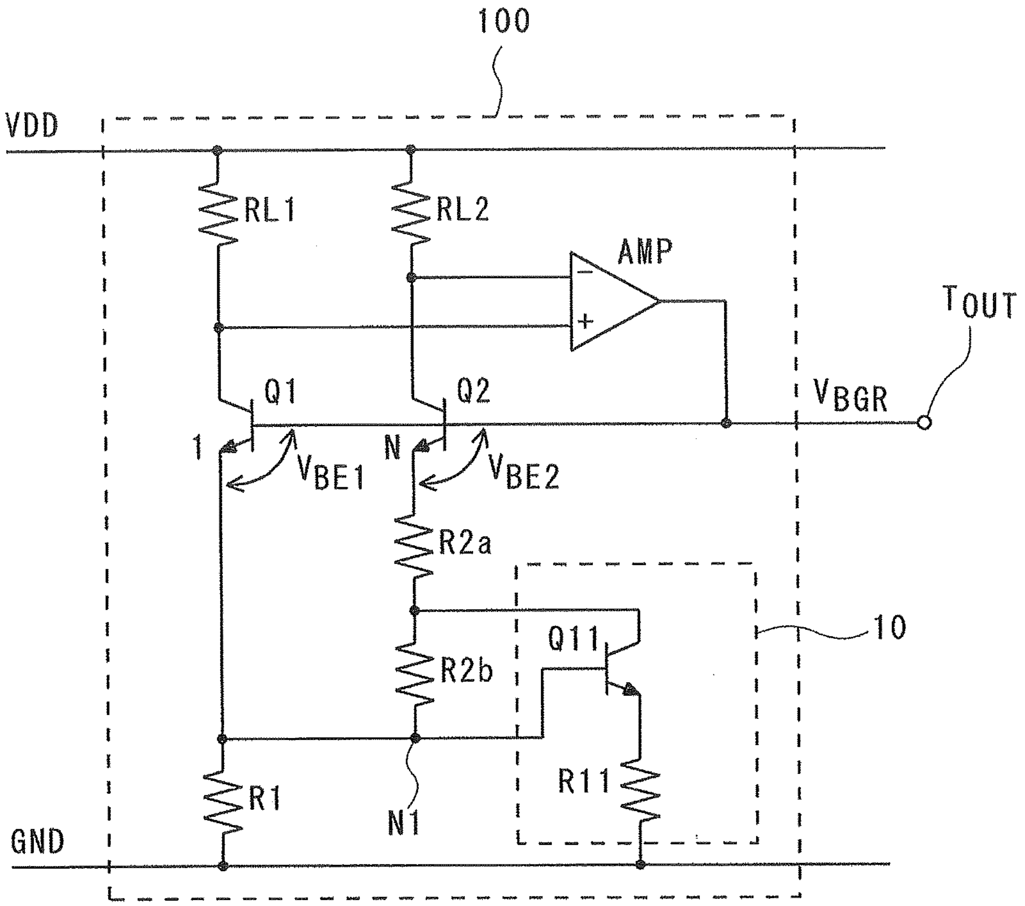
FIG. 4 is a circuit diagram showing a configuration of a BGR circuit 100 according to a first embodiment.

Hereinafter, with reference to the drawings, a bandgap reference (hereinafter referred to as a BGR) circuit 100 according to a first embodiment of the present invention will be described. A BGR circuit 100 according to the first embodiment is included in the power supply circuit that supplies power to the voltage monitoring module shown in FIG. 3, for example, and supplies a reference voltage to the A/D converter VMC_ADC shown in FIG. 3. Unless otherwise stated, the same is applied to BGR circuits according to a second and subsequent embodiments. FIG. 4 is a circuit diagram showing a configuration of the BGR circuit 100 according to the first embodiment. The BGR circuit 100 includes resistors RL1 and RL2, bipolar transistors Q1 and Q2, resistors R1, R2*a* and R2*b*, an amplifier AMP, and a temperature correction circuit 10. The temperature correction circuit 10 corresponds to a first temperature correction circuit. The BGR circuit 100 is connected between a first power supply terminal (e.g., a power supply terminal that supplies a power supply voltage VDD, and hereinafter referred to as a power supply terminal VDD) and a second power supply terminal (e.g., a power supply terminal that supplies a ground voltage GND, and hereinafter referred to as a ground terminal GND), and is supplied with power.

The resistor RL1 is connected between the power supply terminal VDD and the collector of the bipolar transistor Q1. The resistor R1 is connected between the emitter of the bipolar transistor Q1 and the ground terminal GND. The bipolar transistor Q1 corresponds to a first bipolar transistor. The resistor R1 corresponds to a first resistor. The base of the bipolar transistor Q1 is connected to an output terminal $T_{OUT}$.

The resistor RL2 is connected between the power supply terminal VDD and the collector of the bipolar transistor Q2. The resistors R2*a* and R2*b* are connected in series in this order between the emitter of the bipolar transistor Q2 and the emitter of the bipolar transistor Q1. The bipolar transistor Q2 corresponds to a second bipolar transistor. The resistor R2*a* corresponds to a second resistor, and the resistor R2*b* corresponds to a third resistor. The base of the bipolar transistor Q2 is connected to the output terminal $T_{OUT}$.

Figure 24:
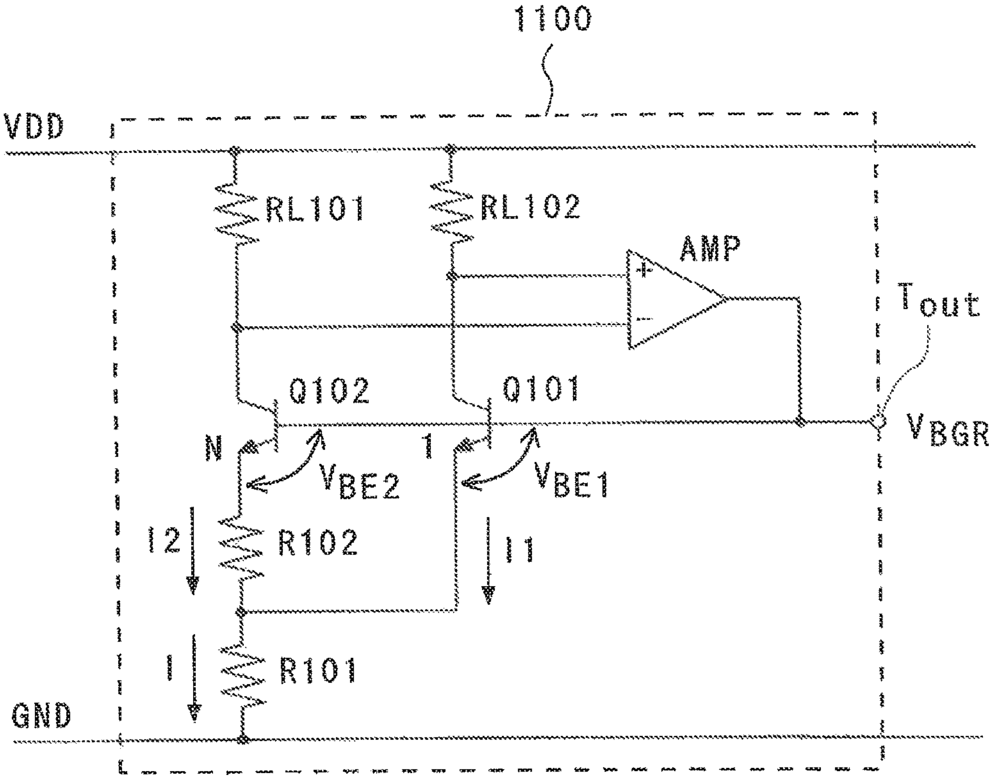
(Related Art) Fig. 24
FIG. 24 is a circuit diagram showing a configuration of a typical BGR circuit 1100.
Figure 25:
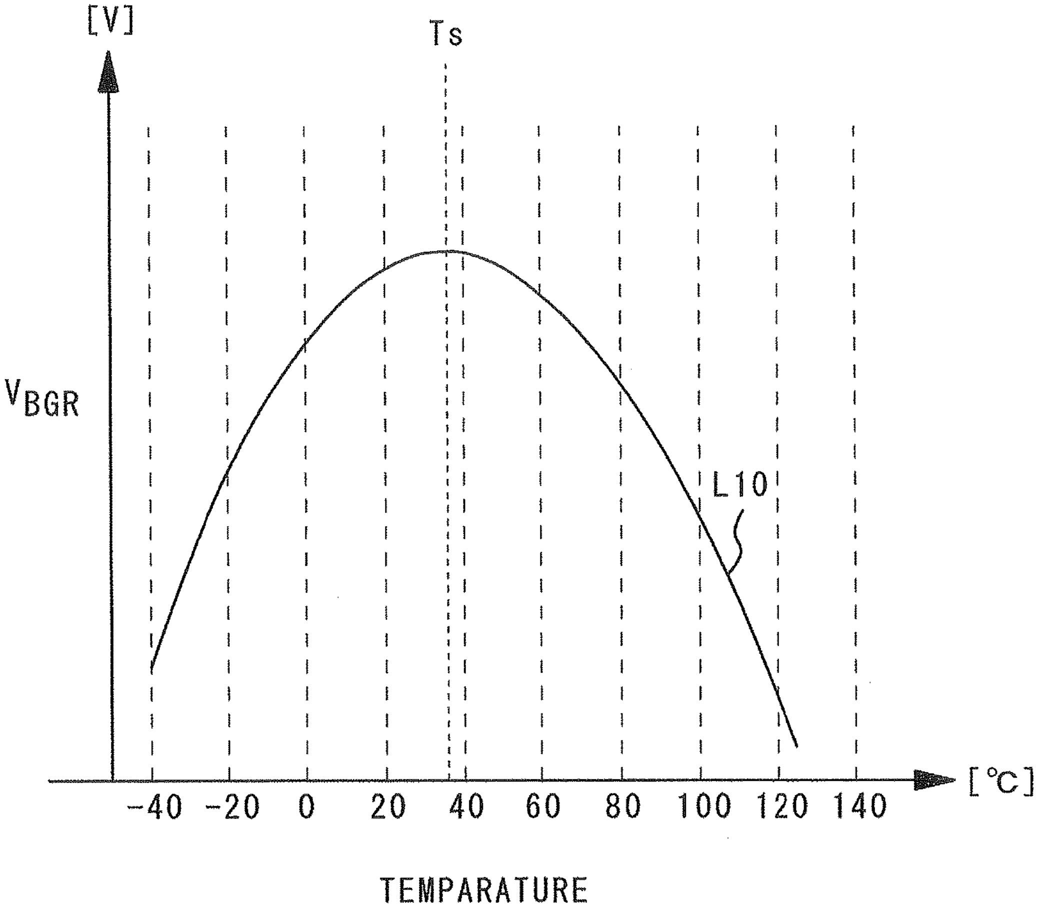
FIG. 25 is a graph showing temperature characteristics of an output voltage $V_{BGR}$ of the typical BGR circuit 1100.

The resistors R2*a* and R2*b* have the same resistance value. Further, the resistors R2*a* and R2*b* each have half the resistance value of that of the resistor R102 of the BGR circuit 1100 shown in FIG. 24. Thus, when the resistance value of the resistor R102 of the BGR circuit 1100 is denoted by R, the resistance value of each of the resistors R2*a* and R2*b* is R/2.

The non-inverting input of the amplifier AMP is connected to the collector of the bipolar transistor Q1, and the inverting input is connected to the collector of the bipolar transistor Q2. The output of the amplifier AMP is connected to the output terminal $T_{OUT}$.

The temperature correction circuit 10 is provided between the ground terminal GND and a node between the resistors R2*a* and R2*b*. The temperature correction circuit 10 includes a transistor Q11 and a resistor R11. The transistor Q11 corresponds to a first transistor. The resistor R11 corresponds to a fourth resistor. The collector of the transistor Q11 is connected to the node between the resistors R2*a* and R2*b*. The resistor R11 is connected between the emitter of the transistor Q11 and the ground terminal GND. The base of the transistor Q11 is connected to a node N1 (i.e., terminal on the side of the bipolar transistor Q1 of the resistor R1).

Note that the bipolar transistor Q1 and the bipolar transistor Q2 have different sizes. In this example, the area ratio of the bipolar transistor Q1 to the bipolar transistor Q2 is 1:N. Therefore, the bipolar transistor Q1 and the bipolar transistor Q2 have different current densities during operation. In summary, the current density $J_1$ of the bipolar transistor Q1 and the current density $J_2$ of the bipolar transistor Q2 satisfy the relation as shown in the following formula (10).

$$\frac{J_2}{J_1} = N \tag{10}$$

Subsequently, an operation of the BGR circuit 100 will be described. As described above, temperature characteristics of an output voltage $V_{BGR}$ of the BGR circuit are shown by a curved line having an upwardly convex shape. In the following description, the temperature at which the curved line having the upwardly convex shape indicating the temperature characteristics of the output voltage $V_{BGR}$ of the BGR circuit indicates the maximum value is denoted by Ts. The temperature correction circuit 10 of the BGR circuit 100 has characteristics that it starts the operation at a predetermined threshold temperature TthH which is higher than Ts. In the following description, the operation of the BGR circuit 100 when the temperature T is lower than TthH and the operation of the BGR circuit 100 when the temperature T is equal to or higher than TthH will be separately described. Further, in the following description, the base-to-emitter voltages of the bipolar transistors Q1 and Q2 are denoted by $V_{BE1}$ and $V_{BE2}$, respectively.

Figure 5:
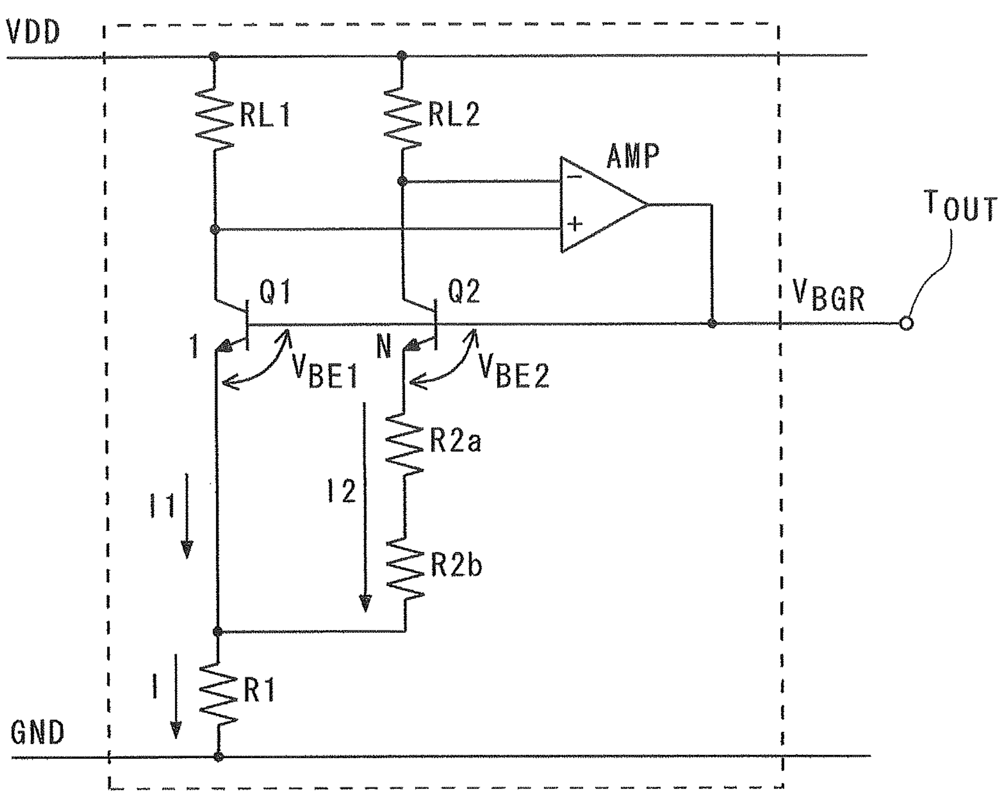
FIG. 5 is an equivalent circuit diagram showing the BGR circuit 100 when T<TthH.

First, a case in which T<TthH will be described. FIG. 5 is an equivalent circuit diagram showing the BGR circuit 100 when T<TthH. As shown in FIG. 5, a current I1 flows through the bipolar transistor Q1, and a current I2 flows through the bipolar transistor Q2 and the resistors R2*a* and R2*b*.

As described above, the resistors R2*a* and R2*b* each have half the resistance value of that of the resistor R102 of the BGR circuit 1100. Accordingly, the BGR circuit 100 when T<TthH has the similar configuration as that of the BGR circuit 1100. In short, the BGR circuit 100 when T<TthH performs the similar operation as in the BGR circuit 1100. Therefore, detailed description of the operation of the BGR circuit 100 when T<TthH will be omitted.

Figure 6:
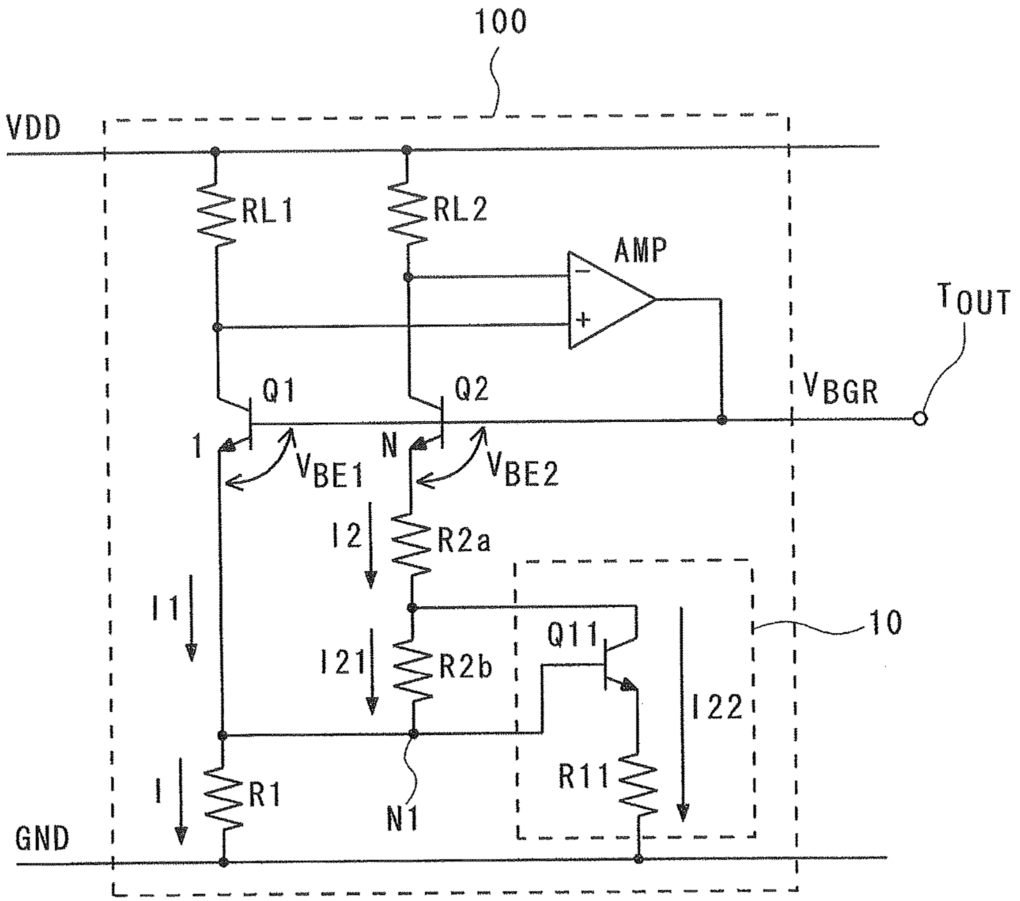
FIG. 6 is an equivalent circuit diagram showing the BGR circuit 100 when T≥TthH.

Next, a case in which T≥TthH will be described. FIG. 6 is an equivalent circuit diagram showing the BGR circuit 100 when T≥TthH. As the temperature T increases above Ts, the current I2 shown in FIG. 5 increases. Therefore, the voltage of the node N1 increases with increasing temperature. When the temperature T exceeds the threshold temperature TthH, the voltage of the node N1 exceeds the threshold voltage of the transistor Q11. Then, the current I22 starts to flow through the transistor Q11 and the resistor R11. Further, the current I21 which is obtained by subtracting the current I22 from the current I2 flows through the resistor R2*b*. Accordingly, the temperature correction circuit 10 starts the operation, and corrects temperature changes of the base-to-emitter voltage $V_{BE1}$ of the bipolar transistor Q1, thereby correcting the output voltage $V_{BGR}$ of the BGR circuit 100. In the BGR circuit 100, parameters of the circuit are set appropriately, thereby being able to set the threshold temperature at which the voltage of the node N1 exceeds the threshold voltage of the transistor Q11. In short, it is possible to set the temperature at which the temperature correction circuit 10 starts the temperature correction operation of the output voltage $V_{BGR}$.

In the following description, the temperature correction operation of the output voltage $V_{BGR}$ of the temperature correction circuit 10 will be described in detail. When T>TthH, the current I flows through the resistor R1. At this time, the output voltage $V_{BGR}$ that appears in the output terminal $T_{OUT}$ is expressed by the following formula (11).

$$V_{BGR}=V_{BE1}+R1\cdot I \tag{11}$$

Since R2*a*=R2*b*, the base-to-emitter voltage $V_{BE1}$ of the bipolar transistor Q1 is expressed by the following formula (12).

$$\begin{aligned} V_{BE1} &= V_{BE2} + R2a \cdot I2 + R2b \cdot I21 \\ &= V_{BE2} + R2a(I2 + I21) \end{aligned} \tag{12}$$

Further, the relation shown by formula (13) is established for the currents I2, I21, and I22.

$$I2 = I21 + I22 \tag{13}$$

From formula (13), the formula (12) can be rewritten into formula (14).

$$V_{BE1} = V_{BE2} + R2a(2 \cdot I2 - I22) \tag{14}$$

Solving formula (14) for the current I2 yields the following formula (15).

$$I2 = \frac{V_{BE1} - V_{BE2}}{2 \cdot R2a} + \frac{I22}{2} \tag{15}$$

Further, $(V_{BE1} - V_{BE2}) = \Delta V_{BE}$ can be expressed by the following formula (16). Note that K is Boltzmann constant, q is the charge of an electron, and T is absolute temperature.

$$\Delta V_{BE} = \frac{KT}{q} \ln\left(\frac{J_2}{J_1}\right) \tag{16}$$

From formula (10), formula (16) can be rewritten into the following formula (17).

$$\Delta V_{BE} = \frac{KT}{q} \ln(N) \tag{17}$$

Substituting formula (17) into formula (15) yields the following formula (18).

$$I2 = \frac{KT}{2q \cdot R2a} \ln(N) + \frac{I22}{2} \tag{18}$$

Further, from formula (13) and formula (18), the current I21 can be expressed by the following formula (19).

$$I21 = \frac{KT}{2q \cdot R2a} \ln(N) - \frac{I22}{2} \tag{19}$$

The BGR circuit 100 operates so that the current I1 becomes equal to the current I2. Thus, when I1=I2, the following formula (20) is established.

$$I = 2 \cdot I2 \tag{20}$$

From formulae (11), (18), and (20), the following formula (21) can be obtained.

$$\begin{aligned} V_{BGR} &= V_{BE1} + (I1 + I21) \times R1 \\ &= V_{BE1} + (I2 + I21) \times R1 \\ &= V_{BE1} + \frac{R1}{R2a} \cdot \frac{KT}{q} \ln(N) \end{aligned} \tag{21}$$

Since the resistance value of each of the resistors R2*a* and R2*b* of the BGR circuit 100 is R/2, formula (21) can be rewritten into formula (22).

$$V_{BGR} = V_{BE1} + 2 \cdot \frac{R1}{R} \cdot \frac{KT}{q} \ln(N) \tag{22}$$

Further, formula (9) can also be rewritten into the same formula as formula (22). In summary, as shown in the second term of the right side of formula (22), the BGR circuit 100 according to this embodiment is able to perform a temperature compensation operation which is similar to that in the typical BGR circuit 1100.

Further, in the BGR circuit 100, since I1=I2, the current I1 can be expressed by the following formula (23).

$$I1 = \frac{KT}{2q \cdot R2} \ln(N) + \frac{I22}{2} \tag{23}$$

In summary, in the BGR circuit 100, the value of the current I1 increases compared to that of the BGR circuit 1100 by the amount corresponding to the second term of the right side of formula (23) Accordingly, as a result that the current I1 increases, the base-to-emitter voltage $V_{BE1}$ of the bipolar transistor Q1 increases. Thus, a positive correction amount can be supplied to the base-to-emitter voltage $V_{BE1}$ of the bipolar transistor Q1 having a negative temperature coefficient by the amount corresponding to the second term of the right side of formula (23). Further, it is possible to supply the correction amount by the second term of the right side of formula (23) without giving influence on parameters other than the base-to-emitter voltage $V_{BE1}$ of the bipolar transistor Q1.

Figure 7:
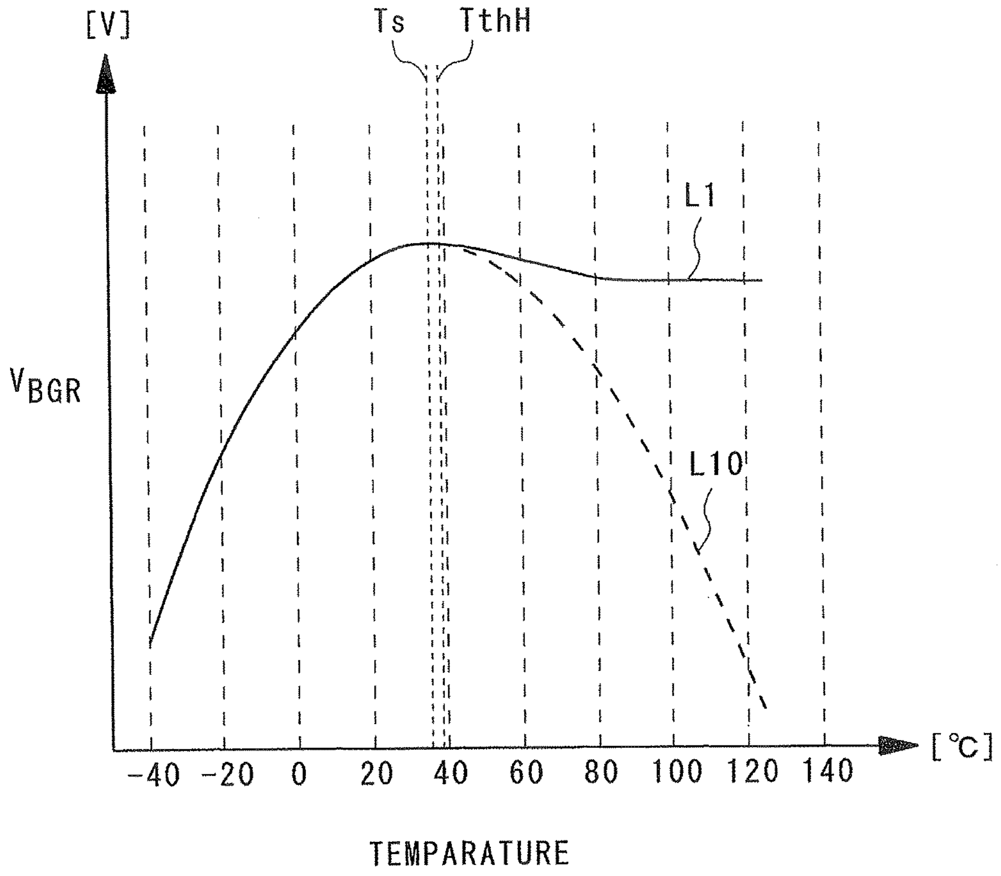
FIG. 7 is a graph showing temperature characteristics of an output voltage $V_{BGR}$ of the BGR circuit 100 according to the first embodiment.

FIG. 7 is a graph showing temperature characteristics of the output voltage $V_{BGR}$ of the BGR circuit 100 according to the first embodiment. In FIG. 7, the temperature characteristics of the BGR circuit 100 according to this embodiment are shown by a curved line L1, and the temperature characteristics of the typical BGR circuit 1100 are shown by a curved line L10. As shown in FIG. 7, the temperature correction circuit 10 starts an operation under a temperature of TthH or higher, to perform temperature correction of the output voltage $V_{BGR}$.

As shown in the curved line L10, when the temperature correction is not performed, the change ratio of the output voltage $V_{BGR}$ of the BGR circuit increases with increasing temperature. Meanwhile, when the temperature correction circuit 10 starts the operation, as shown in formula (23), the current I1 increases with increasing temperature. In short, the correction amount of the output voltage $V_{BGR}$ increases with increasing temperature. In summary, when the temperature correction circuit 10 operates, correction is performed so as to cancel the changes of the output voltage $V_{BGR}$ shown in the curved line L10. Accordingly, the BGR circuit 100 is able to suppress fluctuations in the output voltage $V_{BGR}$ in the temperature range in which the output voltage $V_{BGR}$ has the negative temperature coefficient.

The BGR circuit 100 is able to adjust the correction amount by adjusting the resistance value of the resistor R11 of the temperature correction circuit 10. In order to determine the resistance value of the resistor R11, the BGR circuit 100 is manufactured on a semiconductor substrate, and then the temperature characteristics of the BGR circuit 100 are measured. Then physical processing including laser trimming is performed in order to adjust the length of the resistance element formed on a substrate, for example, based on the measurement results, thereby being able to adjust the resistance value. In summary, it is possible to adjust the resistance value as calibration before the BGR circuit is installed in a target product.

Second Embodiment

Figure 8:
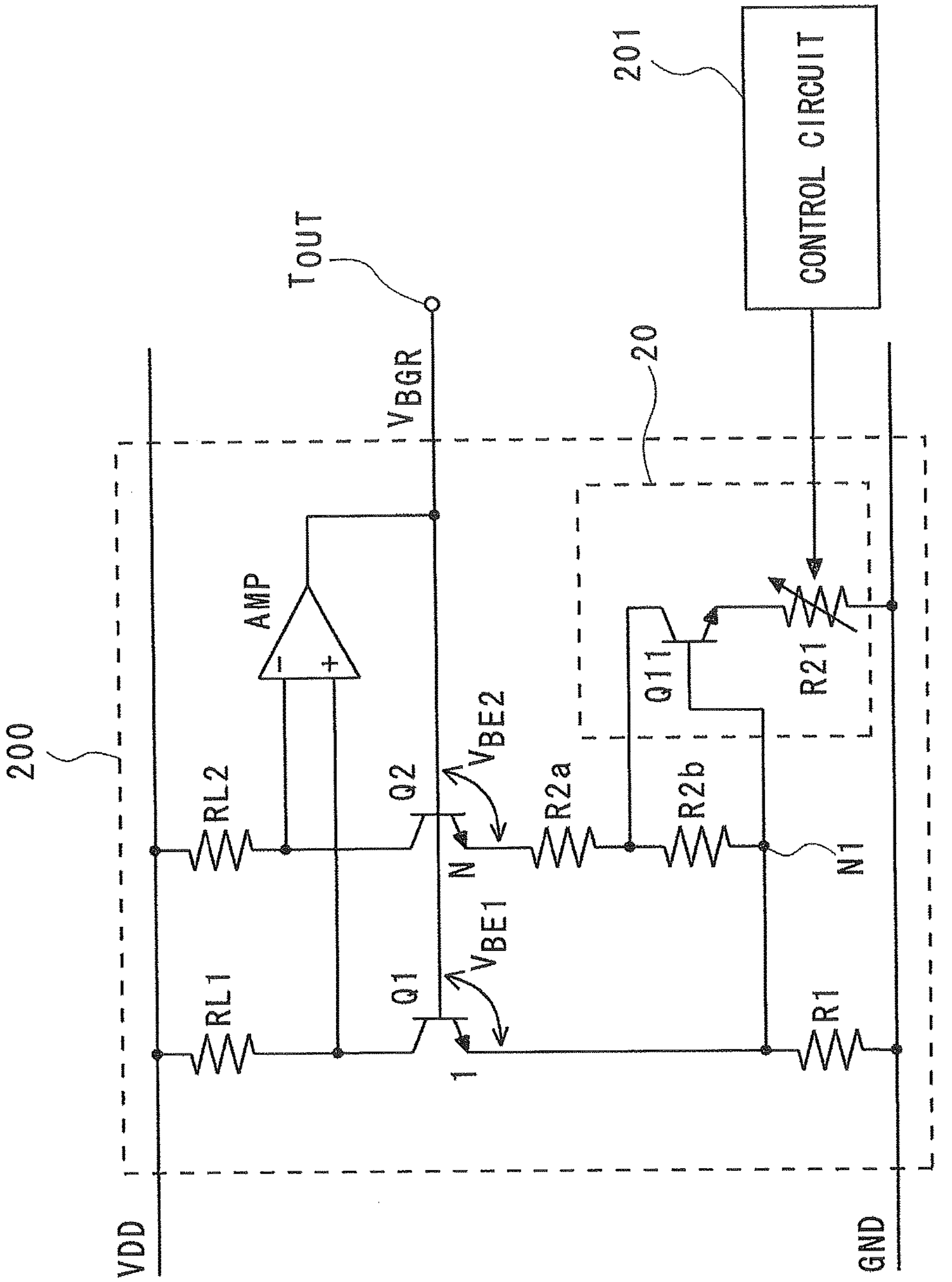
FIG. 8 is a circuit diagram showing a configuration of a BGR circuit 200 according to a second embodiment.

Next, a BGR circuit 200 according to a second embodiment will be described. FIG. 8 is a circuit diagram showing a configuration of the BGR circuit 200 according to the second embodiment. The BGR circuit 200 has a configuration in which the temperature correction circuit 10 of the BGR circuit 100 according to the first embodiment is replaced with a temperature correction circuit 20. The temperature correction circuit 20 corresponds to a first temperature correction circuit.

The temperature correction circuit 20 has a configuration in which the resistor R11 of the temperature correction circuit 10 is replaced with a variable resistor R21. Note that the variable resistor R21 corresponds to a fourth resistor. Other configurations of the BGR circuit 200 are similar to those of the BGR circuit 100, and thus description will be omitted.

The BGR circuit 200 supplies a control signal to the variable resistor R21 from an external control circuit 201, for example, thereby being able to set the resistance value of the variable resistor R21. Accordingly, it is possible to adjust the temperature characteristics of the BGR circuit without performing physical processing including laser trimming as in the BGR circuit 100 according to the first embodiment, for example.

Third Embodiment

Figure 9:
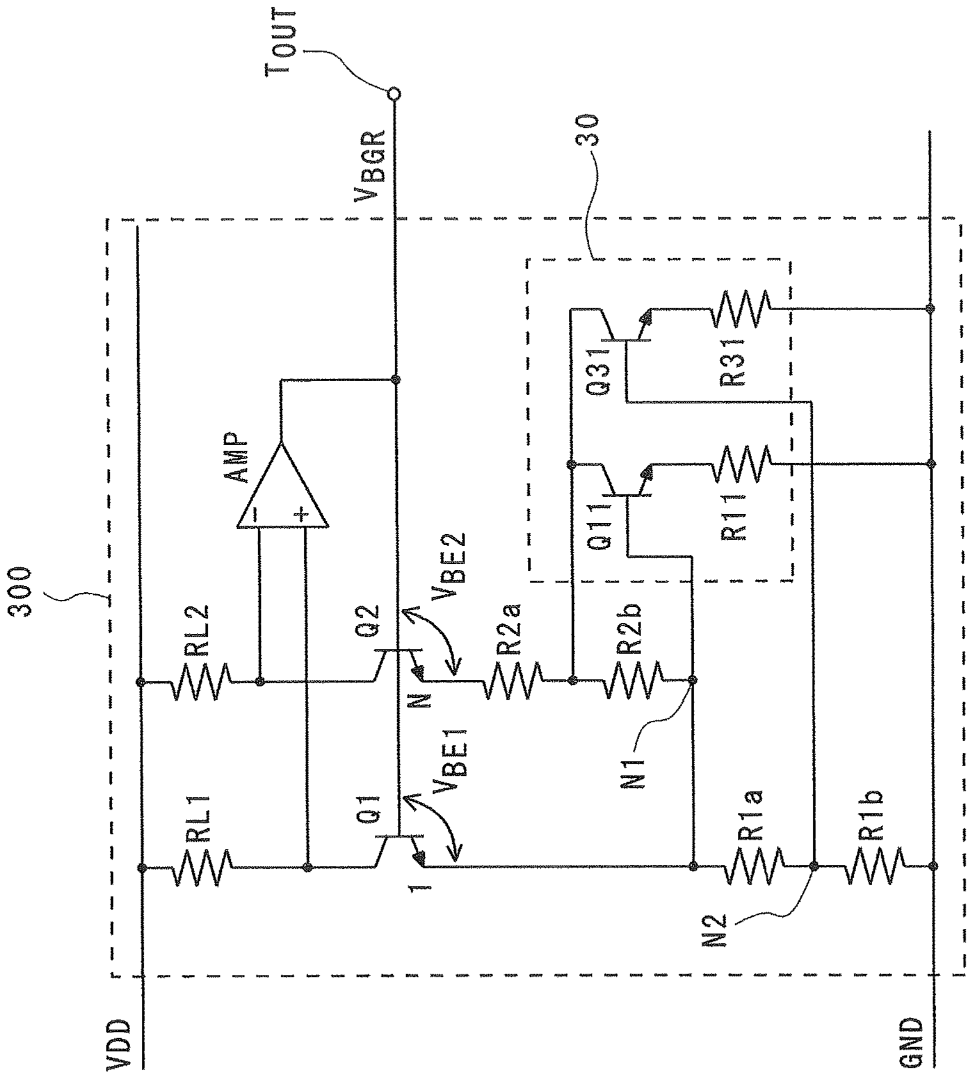
FIG. 9 is a circuit diagram showing a configuration of a BGR circuit 300 according to a third embodiment.

Next, a BGR circuit 300 according to a third embodiment will be described. FIG. 9 is a circuit diagram showing a configuration of the BGR circuit 300 according to the third embodiment. The BGR circuit 300 has a configuration in which the temperature correction circuit 10 of the BGR circuit 100 according to the first embodiment is replaced with a temperature correction circuit 30 and the resistor R1 is divided into resistors R1*a* and R1*b*. Note that the temperature correction circuit 30 corresponds to the first temperature correction circuit.

The resistors R1*a* and R1*b* are connected in series in this order between the emitter of the bipolar transistor Q1 and the ground terminal GND. The resistor R1*a* corresponds to a first resistor and the resistor R1*b* corresponds to a fifth resistor. In short, the BGR circuit 300 has a configuration in which the fifth resistor (resistor R1*b*) is provided between the first resistor (resistor R1*a*) and the second power supply terminal (ground terminal GND). The resistors R1*a* and R1*b* have the same resistance value. Further, the resistors R1*a* and R1*b* each have half the resistance value of that of the resistor R1 of the BGR circuit 100. For example, when the resistance value of the resistor R1 of the BGR circuit 100 is denoted by R, the resistance value of each the resistors R1*a* and R1*b* is R/2.

The temperature correction circuit 30 has a configuration in which a transistor Q31 and a resistor R31 are added to the temperature correction circuit 10. The transistor Q31 corresponds to a second transistor. The resistor R31 corresponds to a sixth resistor. The collector of the transistor Q31 is connected to a node between the resistors R2*a* and R2*b*. The resistor R31 is connected between the emitter of the transistor Q31 and the ground terminal GND. The base of the transistor Q31 is connected to a node N2 between the resistor R1*a* and the resistor R1*b*. The other configurations of the BGR circuit 300 are similar to those of the BGR circuit 100, and thus description will be omitted.

In the temperature correction circuit 30 of the BGR circuit 300, different voltages are input to the bases of the transistors Q11 and Q31. Therefore, the timing at which the transistor Q11 is turned on and the timing at which the transistor Q31 is turned on can be made different from each other. In this embodiment, for example, the temperature at which the transistor Q11 is turned on is denoted by TthH1, and the temperature at which the transistor Q31 is turned on is denoted by TthH2 (TthH1<TthH2).

Figure 10:
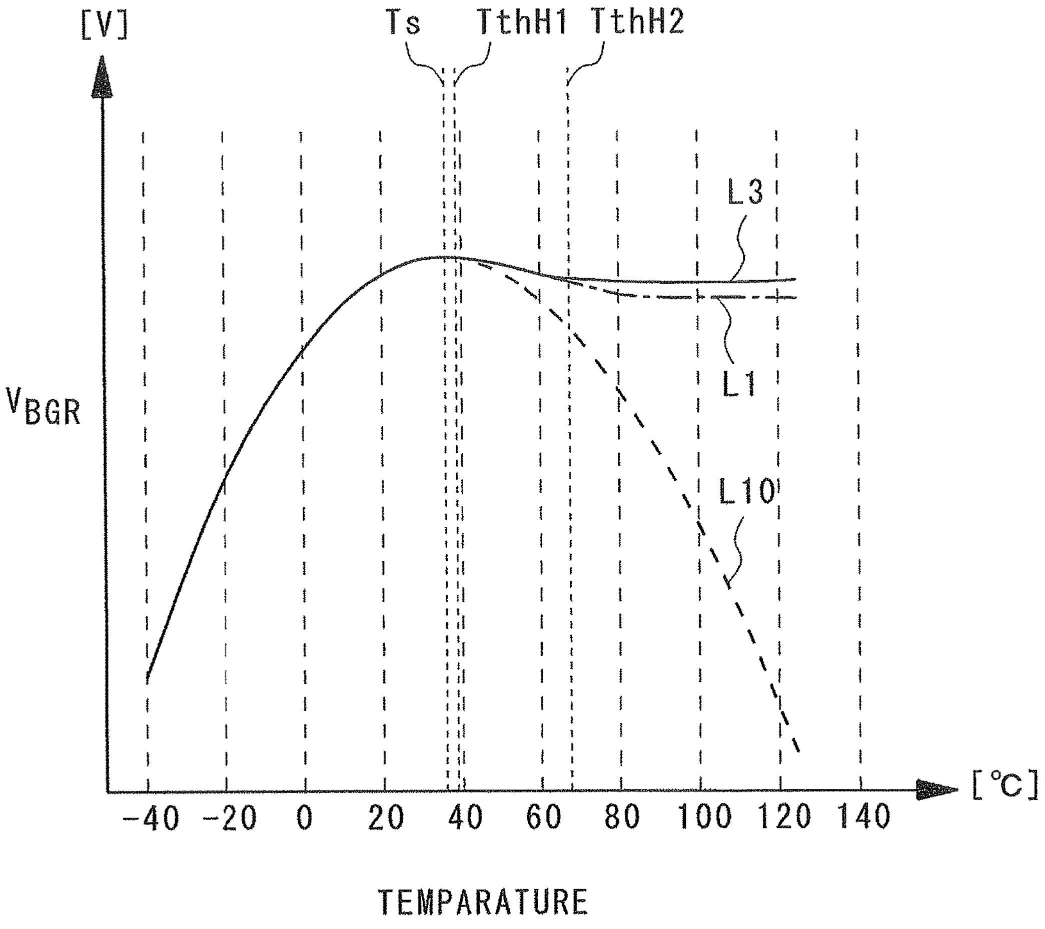
FIG. 10 is a graph showing temperature characteristics of an output voltage $V_{BGR}$ of the BGR circuit 300 according to the third embodiment.

FIG. 10 is a graph showing temperature characteristics of the output voltage $V_{BGR}$ of the BGR circuit 300 according to the third embodiment. In FIG. 10, the temperature characteristics of the BGR circuit 300 according to this embodiment are shown by a curved line L3. Further, the temperature characteristics of the BGR circuit 100 according to the first embodiment are shown by a curved line L1, and the temperature characteristics of the typical BGR circuit 1100 are shown by a curved line L10.

As shown in the curved line L3, first, when the temperature reaches TthH1, the transistor Q11 is ON, and correction of the temperature characteristics of the output voltage $V_{BGR}$ is started. Then, the temperature further increases, which increases the amount of decrease in the output voltage $V_{BGR}$. When the temperature reaches TthH2, the transistor Q31 is ON, and the correction amount of the output voltage $V_{BGR}$ further increases.

In summary, even when the decrease rate of the output voltage increases with increasing temperature, the BGR circuit 300 is able to suppress fluctuations in the output voltage $V_{BGR}$ by using a plurality of transistors that are turned on at different temperatures. In FIG. 10, it is shown that the decrease rate of the output voltage $V_{BGR}$ is smaller in the curved line L3 compared to that in the curved line L1.

This embodiment has been described taking a case as an example in which the temperature correction circuit 30 includes two transistors that are connected in parallel. However, the temperature correction circuit 30 may include three or more transistors.

Fourth Embodiment

Figure 11:
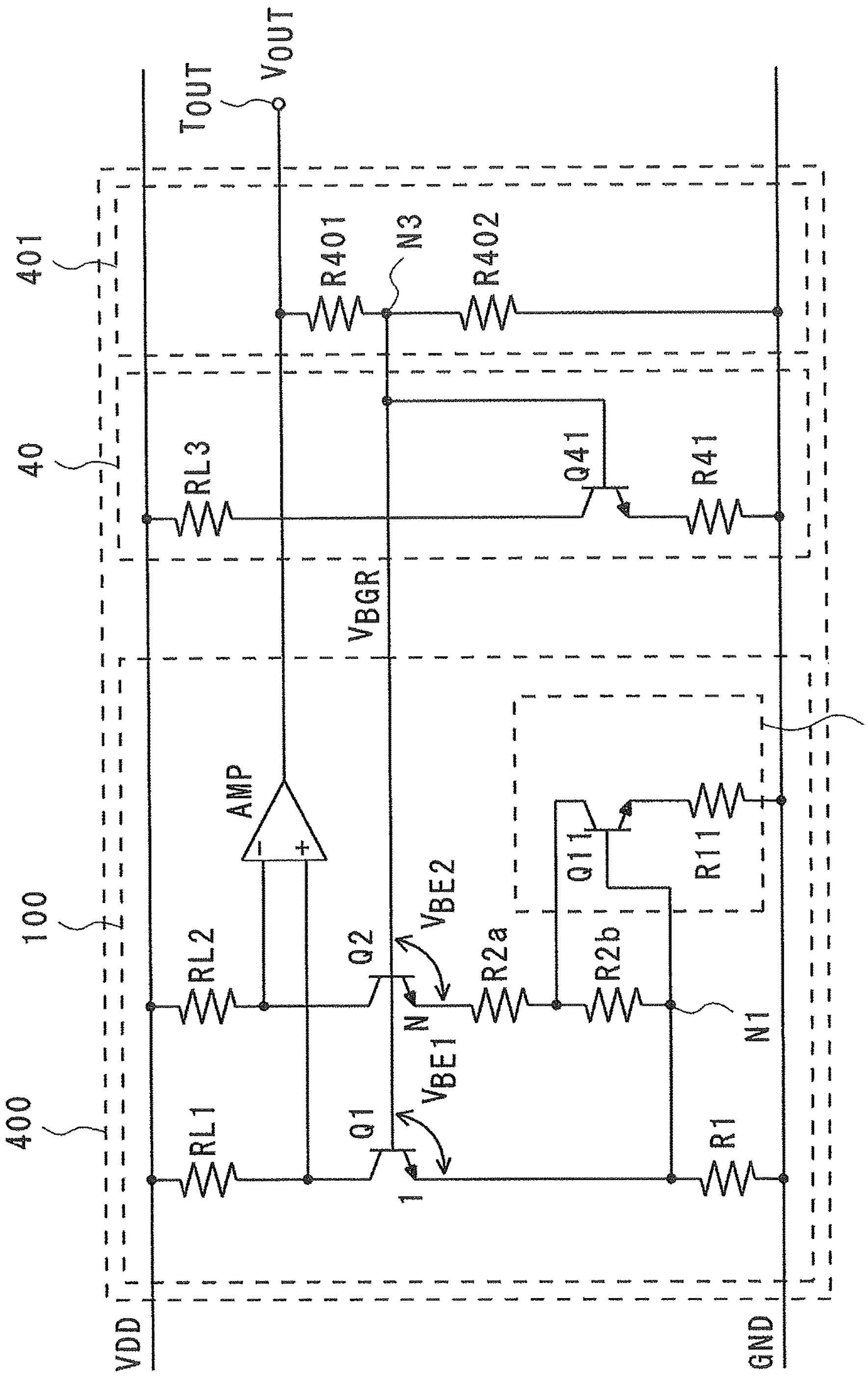
FIG. 11 is a circuit diagram showing a configuration of a power supply circuit 400 according to a fourth embodiment.

Next, a power supply circuit 400 according to a fourth embodiment will be described. FIG. 11 is a circuit diagram showing a configuration of the power supply circuit 400 according to the fourth embodiment. The power supply circuit 400 includes the BGR circuit 100 according to the first embodiment, a temperature correction circuit 40, and a booster unit 401. The temperature correction circuit 40 corresponds to a second temperature correction circuit. Since the BGR circuit 100 is similar to that in the first embodiment, description thereof will be omitted.

The booster unit 401 includes booster resistors R401 and R402. The booster resistor R401 corresponds to a first booster resistor, and the booster resistor R402 corresponds to a second booster resistor. The booster resistors R401 and R402 are connected in this order among the output of the amplifier AMP of the BGR circuit 100, the output terminal $T_{OUT}$, and the ground terminal GND. The output voltage $V_{BGR}$ of the BGR circuit 100 is input to a node N3 between the booster resistors R401 and R402.

The temperature correction circuit 40 includes a resistor RL3, a bipolar transistor Q41, and a resistor R41. The bipolar transistor Q41 corresponds to a third bipolar transistor. The resistor R41 corresponds to a seventh resistor. The resistor RL3 is connected between the power supply terminal VDD and the collector of the bipolar transistor Q41. The resistor R41 is connected between the emitter of the bipolar transistor Q41 and the ground terminal GND. The base of the bipolar transistor Q41 is connected to the node N3 between the booster resistors R401 and R402 of the booster unit 401.

Subsequently, an operation of the power supply circuit 400 will be described. As stated above, the temperature characteristics of the output voltage $V_{BGR}$ of the BGR circuit are shown by a curved line having an upwardly convex shape. Similarly, in the power supply circuit for outputting the output voltage $V_{OUT}$ which is obtained by boosting the output voltage $V_{BGR}$ of the BGR circuit, the temperature characteristics of the output voltage $V_{OUT}$ are shown by a curved line having an upwardly convex shape. In the following description, the temperature at which the curved line having the upwardly convex shape showing temperature characteristics of the output voltage $V_{OUT}$ of the power supply circuit indicates the maximum value is denoted by Ts. The temperature correction circuit 40 of the power supply circuit 400 has a characteristic that it operates under a temperature that is equal to or lower than the predetermined threshold temperature TthL which is lower than the temperature Ts. In the following description, the operation of the power supply circuit 400 when the temperature T is higher than TthL and the operation of the power supply circuit 400 when the temperature T is equal to or lower than TthL will be separately described.

Figure 12:
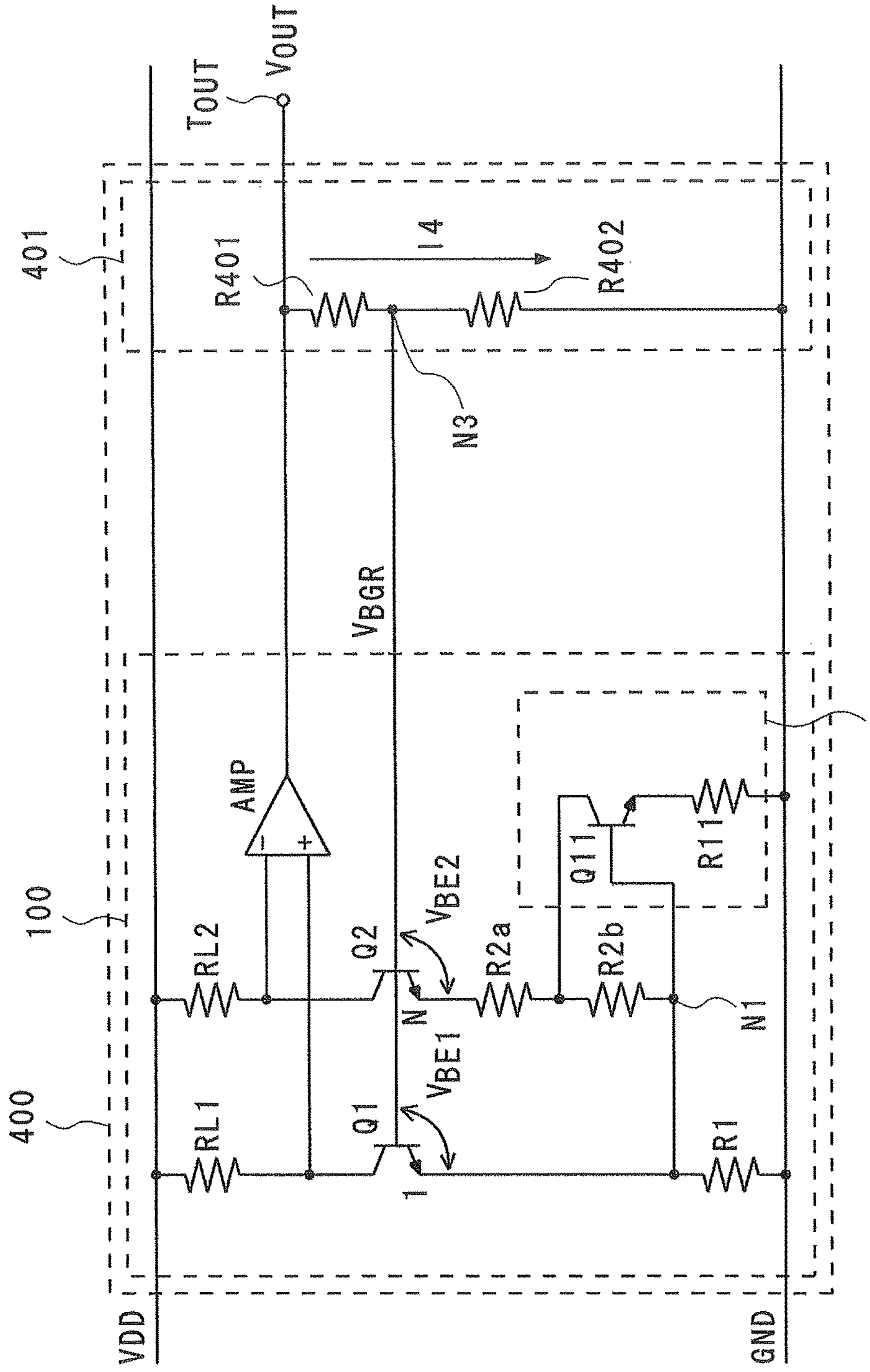
FIG. 12 is an equivalent circuit diagram showing the power supply circuit 400 when T>ThL.

First, a case in which T>TthL will be described. FIG. 12 is an equivalent circuit diagram showing the power supply circuit 400 when T>TthL. When T>TthL, the bipolar transistor Q41 is OFF. In this case, as shown in FIG. 12, a current I4 flows through the booster resistor R401 and the booster resistor R402.

The output voltage $V_{BGR}$ of the BGR circuit 100 is boosted to the output voltage $V_{OUT}$ by the booster unit 401. For example, when the output voltage $V_{BGR}$ at the temperature Ts is 1.25 V, the output voltage $V_{OUT}$ is 4.7 V. However, this is merely an example, and $V_{BGR}$ and $V_{OUT}$ may have other values.

Figure 13:
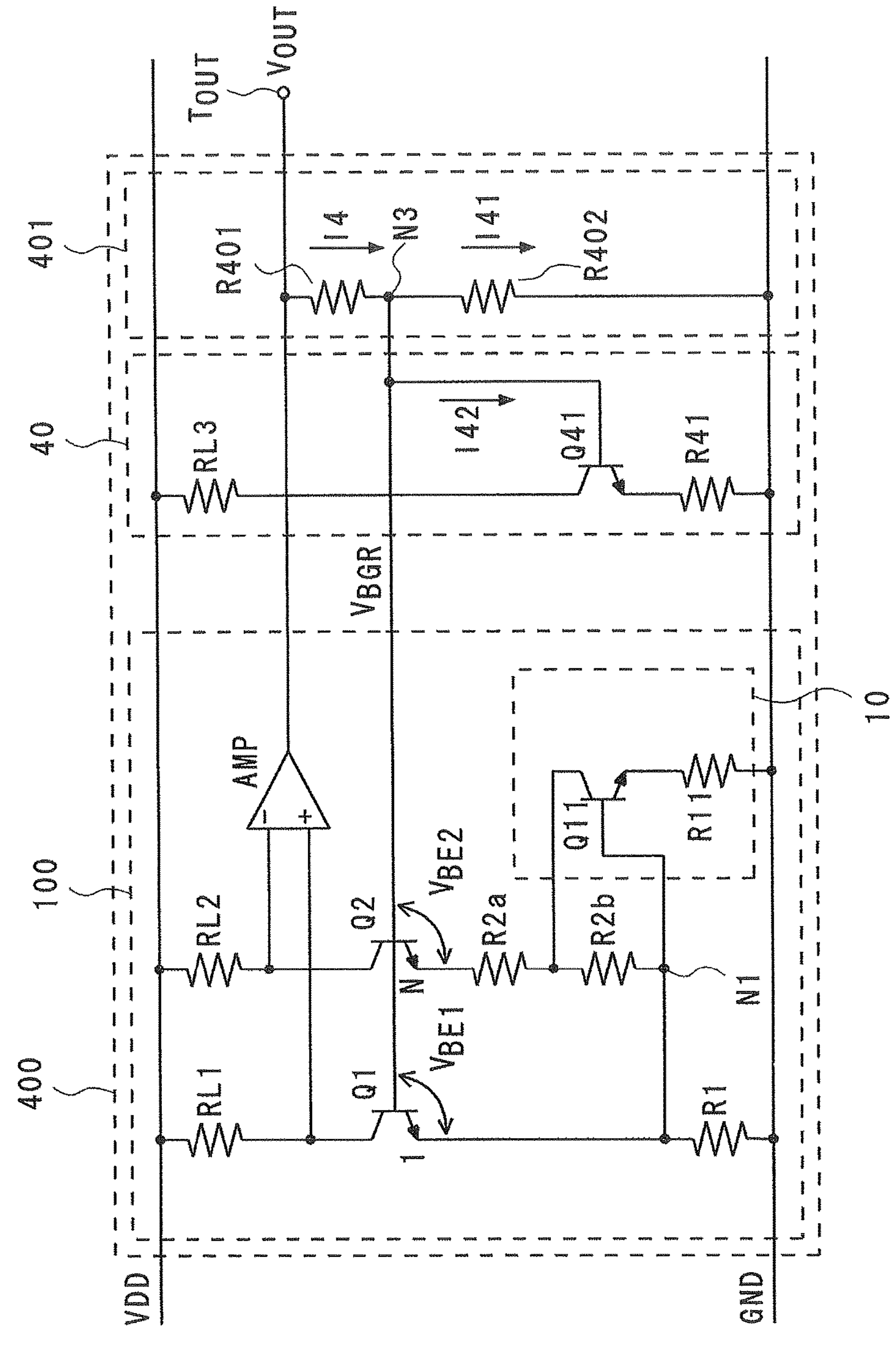
FIG. 13 is an equivalent circuit diagram showing the power supply circuit 400 when T≤TthL.

Next, a case in which T TthL will be described. When the temperature T is below the threshold temperature TthL, the bipolar transistor Q41 is ON. FIG. 13 is an equivalent circuit diagram showing the power supply circuit 400 when T TthL. In this case, the current I4 flows through the booster resistor R401. A current 141 flows through the booster resistor R402. A base current I42 flows through the base of the bipolar transistor Q41.

This base current I42 has a negative temperature coefficient. Accordingly, the base current I42 increases with decreasing temperature T. Therefore, the current I4 increases by the amount of the base current I42 according to the decrease in temperature. As a result, when T≤TthL, it is possible to supply the correction amount having a negative temperature coefficient to the output voltage $V_{OUT}$ which originally has a positive coefficient.

Figure 14:
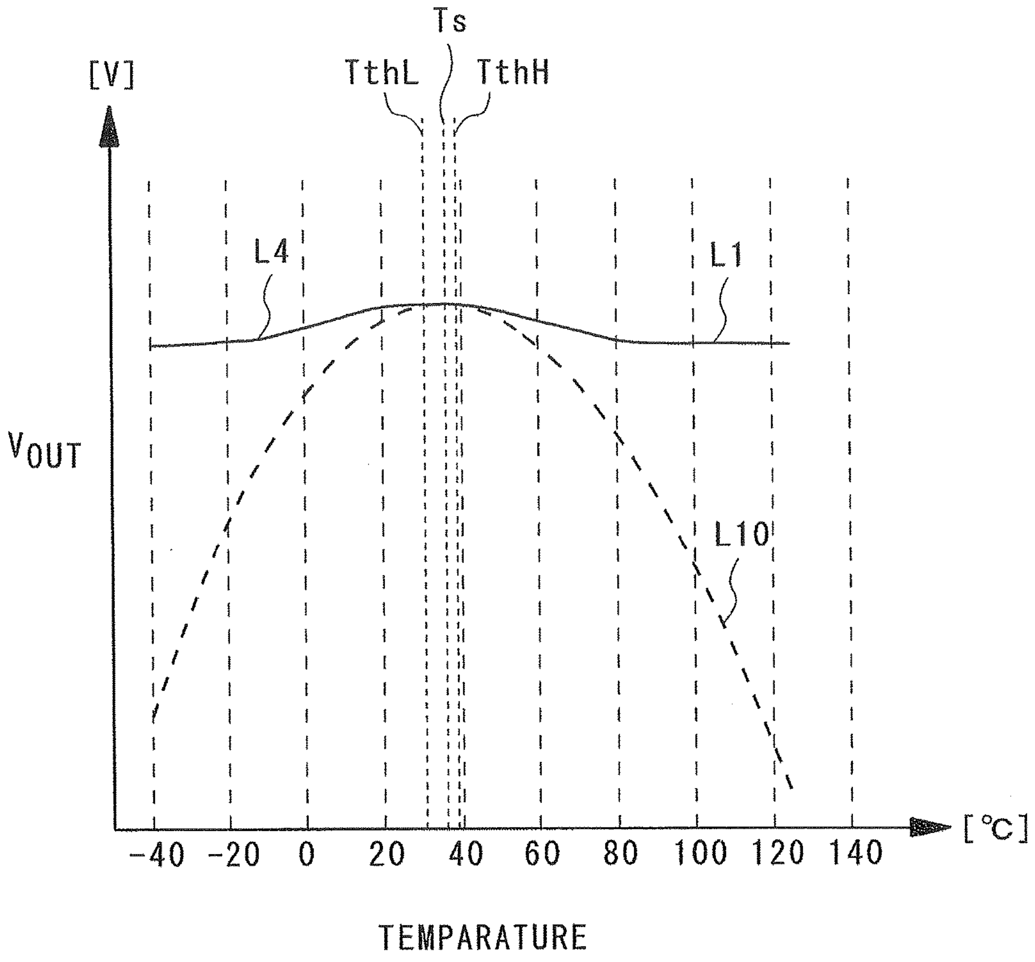
FIG. 14 is a graph showing temperature characteristics of an output voltage $V_{OUT}$ of the power supply circuit 400 according to the fourth embodiment.

FIG. 14 is a graph showing temperature characteristics of the output voltage $V_{OUT}$ of the power supply circuit 400 according to the fourth embodiment. In FIG. 14, the temperature characteristics of the output voltage $V_{OUT}$ of the power supply circuit 400 according to this embodiment is shown by a curved line L4. Further, the temperature characteristics of the output voltage $V_{OUT}$ when the typical BGR circuit 1100 is used are shown by a curved line L10, and the temperature characteristics of the output voltage $V_{OUT}$ when there is no temperature correction circuit 40 are shown by L1. The temperature correction circuit 40 operates in a range which is on the lower temperature side than the temperature Ts. This is combined with the temperature correction circuit 10 that operates on the higher temperature side than the temperature Ts, thereby being able to suppress fluctuations in the output voltage $V_{OUT}$ output from the power supply circuit 400 in a wide temperature range.

By setting parameters of the circuit of the temperature correction circuit 40 appropriately, it is possible to set the timing at which the bipolar transistor Q41 is turned on. In short, it is possible to set the temperature at which the temperature correction operation of the temperature correction circuit 40 starts.

The power supply circuit 400 adjusts the resistance value of the resistor R41 of the temperature correction circuit 40, thereby being able to adjust the correction amount. In order to determine the resistance value of the resistor R41, the power supply circuit 400 is manufactured on a semiconductor substrate, and then the temperature characteristics of the power supply circuit 400 are measured. Then, physical processing including laser trimming is performed in order to adjust the length of the resistance element formed on the substrate, for example, based on the measurement results, thereby being able to adjust the resistance value. In short, it is possible to adjust the resistance value as calibration before the power supply circuit is installed in a target product.

Fifth Embodiment

Figure 15:
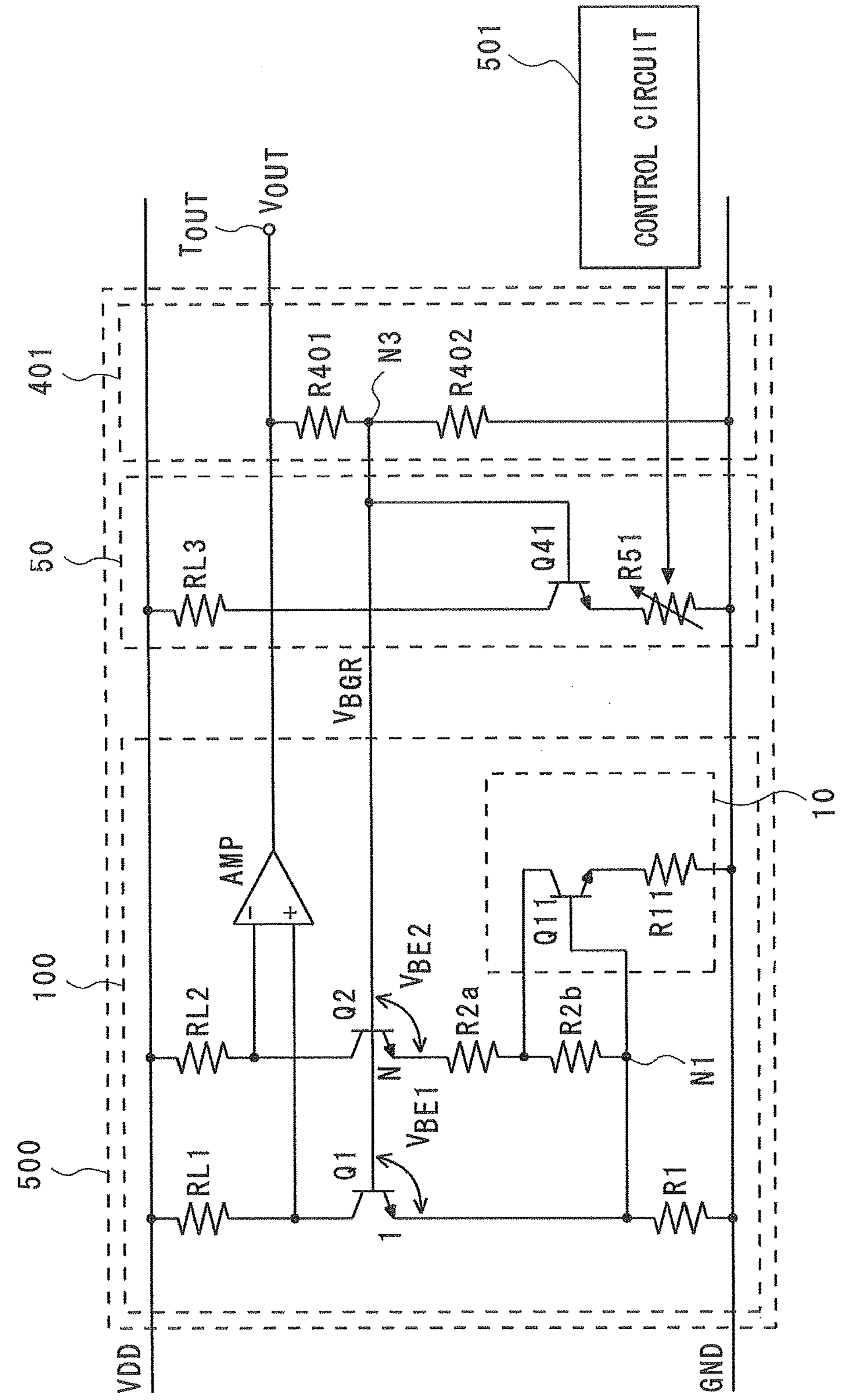
FIG. 15 is a circuit diagram showing a configuration of a power supply circuit 500 according to a fifth embodiment.

Next, a power supply circuit 500 according to a fifth embodiment will be described. FIG. 15 is a circuit diagram showing a configuration of the power supply circuit 500 according to the fifth embodiment. The power supply circuit 500 has a configuration in which the temperature correction circuit 40 according to the fourth embodiment is replaced with a temperature correction circuit 50. Note that the temperature correction circuit 50 corresponds to a second temperature correction circuit.

The temperature correction circuit 50 has a configuration in which the resistor R41 of the temperature correction circuit 40 is replaced with a variable resistor R51. Note that the resistor R51 corresponds to a seventh resistor. Other configurations of the power supply circuit 500 are similar to those of the power supply circuit 400, and thus description will be omitted.

The power supply circuit 500 supplies a control signal from an external control circuit 501 to the variable resistor R51, for example, thereby being able to set the resistance value of the variable resistor R51. Accordingly, it is possible to adjust the temperature characteristics of the power supply circuit without performing physical processing including laser trimming as in the power supply circuit 400 according to the fourth embodiment.

Sixth Embodiment

Figure 16:
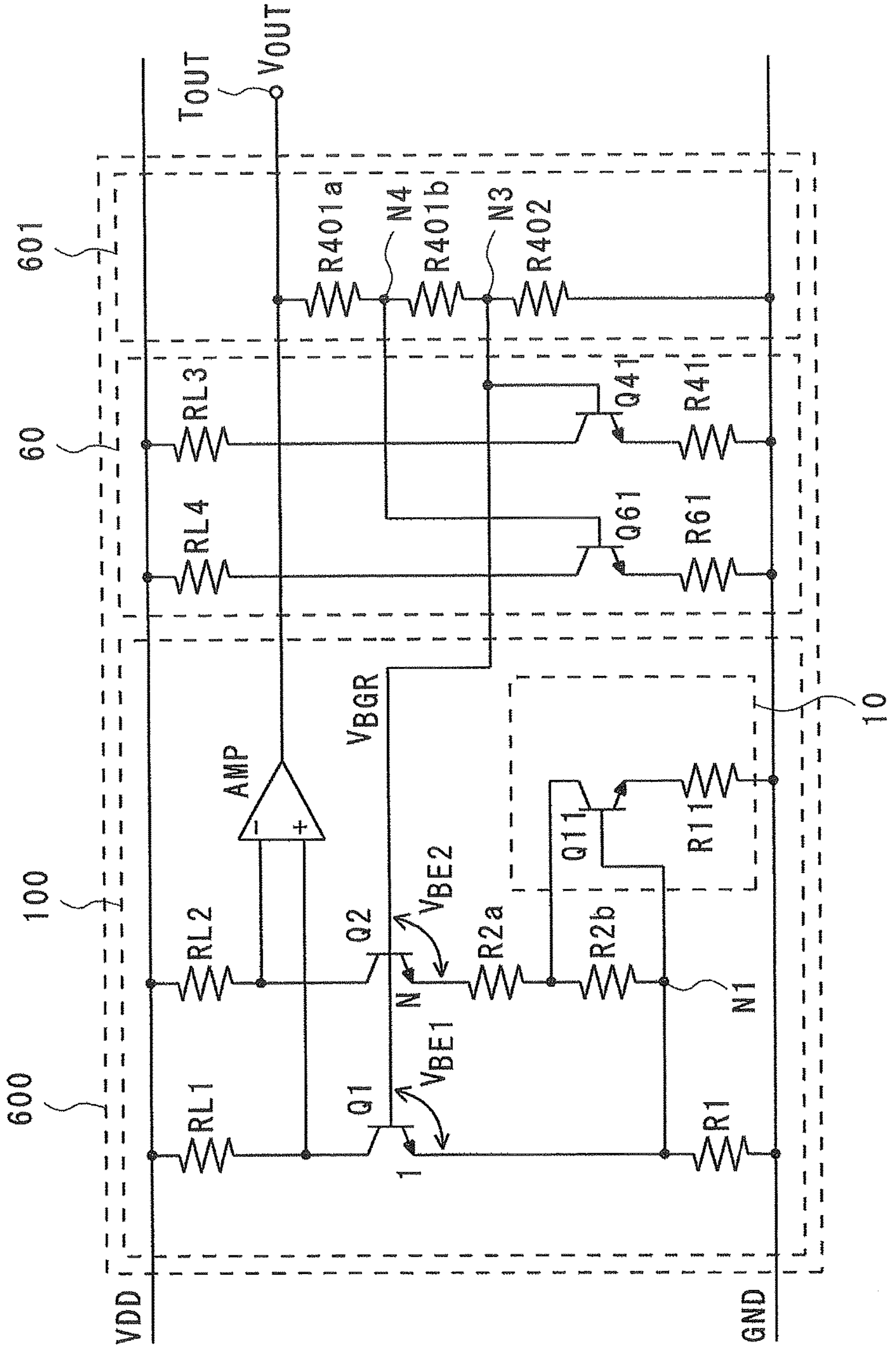
FIG. 16 is a circuit diagram showing a configuration of a power supply circuit 600 according to a sixth embodiment.

Next, a power supply circuit 600 according to a sixth embodiment will be described. FIG. 16 is a circuit diagram showing a configuration of the power supply circuit 600 according to the sixth embodiment. The power supply circuit 600 has a configuration in which the temperature correction circuit 40 of the power supply circuit 400 according to the fourth embodiment is replaced with a temperature correction circuit 60, and the booster unit 401 is replaced with a booster unit 601. Note that the temperature correction circuit 60 corresponds to a second temperature correction circuit.

The booster unit 601 has a configuration in which the booster resistor R401 of the booster unit 401 is divided into booster resistors R401*a* and R401*b*. Note that the booster resistor R401*a* corresponds to a third booster resistor, and the booster resistor R401*b* corresponds to a first booster resistor. In summary, the booster unit 601 has a configuration in which the third booster resistor (booster resistor R401*a*) is provided between the first booster resistor (booster resistor R401*b*) and the output terminal $T_{OUT}$. The booster resistors R401*a* and R401*b* have the same resistance value. Further, the booster resistors R401*a* and R401*b* each have half the resistance value of that of the resistor R41 of the booster unit 401. Thus, when the resistance value of the resistor R41 of the booster unit 401 is denoted by R, the resistance value of each of the booster resistors R401*a* and R401*b* is R/2.

The temperature correction circuit 60 has a configuration in which a bipolar transistor Q61 and resistors RL4 and R61 are added to the temperature correction circuit 40. The bipolar transistor Q61 corresponds to a fourth bipolar transistor. The resistor R61 corresponds to an eighth resistor. The resistor RL4 is connected between the power supply terminal VDD and the collector of the bipolar transistor Q61. The resistor R61 is connected between the emitter of the bipolar transistor Q61 and the ground terminal GND. The base of the bipolar transistor Q61 is connected to a node N4 between the booster resistors R401*a* and R401*b* of the booster unit 601. Other configurations of the power supply circuit 600 are similar to those of the power supply circuit 400, and thus description will be omitted.

In the temperature correction circuit 60 of the power supply circuit 600, different voltages are input to the bases of the bipolar transistors Q41 and Q61. Accordingly, the timing at which the bipolar transistor Q41 is turned on and the timing at which the bipolar transistor Q61 is turned on can be made different. For example, the temperature at which the bipolar transistor Q41 is turned on is denoted by TthL1, and the temperature at which the bipolar transistor Q61 is turned on is denoted by TthL2 (TthL1>TthL2).

Figure 17:
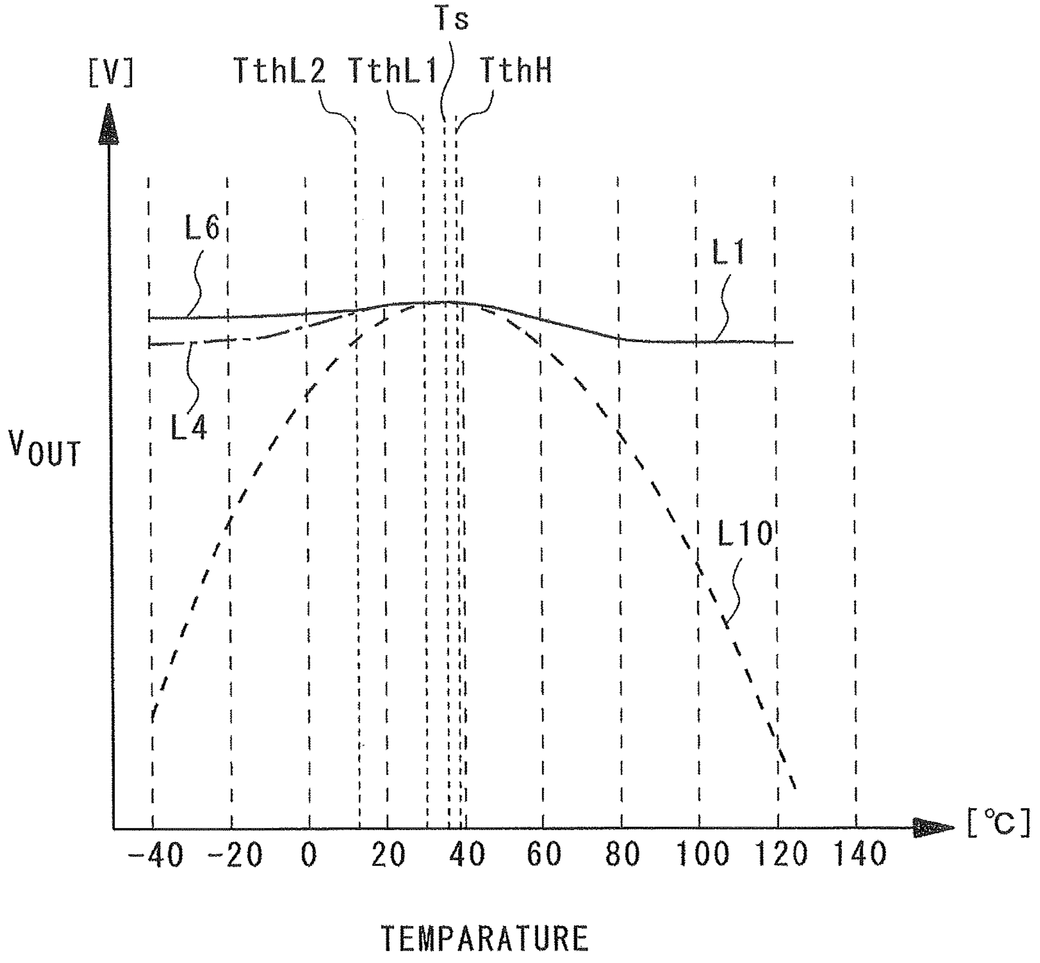
FIG. 17 is a graph showing temperature characteristics of an output voltage $V_{OUT}$ of the power supply circuit 600 according to the sixth embodiment.

FIG. 17 is a graph showing temperature characteristics of the output voltage $V_{OUT}$ of the power supply circuit 600 according to the sixth embodiment. FIG. 17 shows the temperature characteristics of the output voltage $V_{OUT}$ of the power supply circuit 600 according to this embodiment by a curved line L6. Further, the temperature characteristics of the output voltage $V_{OUT}$ when the typical BGR circuit 1100 is used are shown by a curved line L10. The temperature characteristics of the output voltage $V_{OUT}$ when there is no temperature correction circuit 60 is shown by L1. The temperature characteristics of the output voltage $V_{OUT}$ of the power supply circuit 400 according to the fourth embodiment is shown by a curved line L4. First, when the temperature decreases to TthL1, the bipolar transistor Q41 is turned on, and the correction of the temperature characteristics of the output voltage $V_{OUT}$ is started. When the temperature further decreases, the amount of decrease in the output voltage $V_{OUT}$ increases. When the temperature decreases to TthL2, the bipolar transistor Q61 is turned on and the correction amount of the output voltage $V_{OUT}$ further increases.

In summary, even when the decrease rate of the output voltage increases with decreasing temperature, the power supply circuit 600 is able to further suppress fluctuations in the output voltage $V_{OUT}$ by using a plurality of transistors that are turned on at different temperatures. The case in which the temperature correction circuit 60 includes two transistors connected in parallel has been described in this embodiment. However, the temperature correction circuit 60 may include three or more transistors.

Seventh Embodiment

Figure 18:
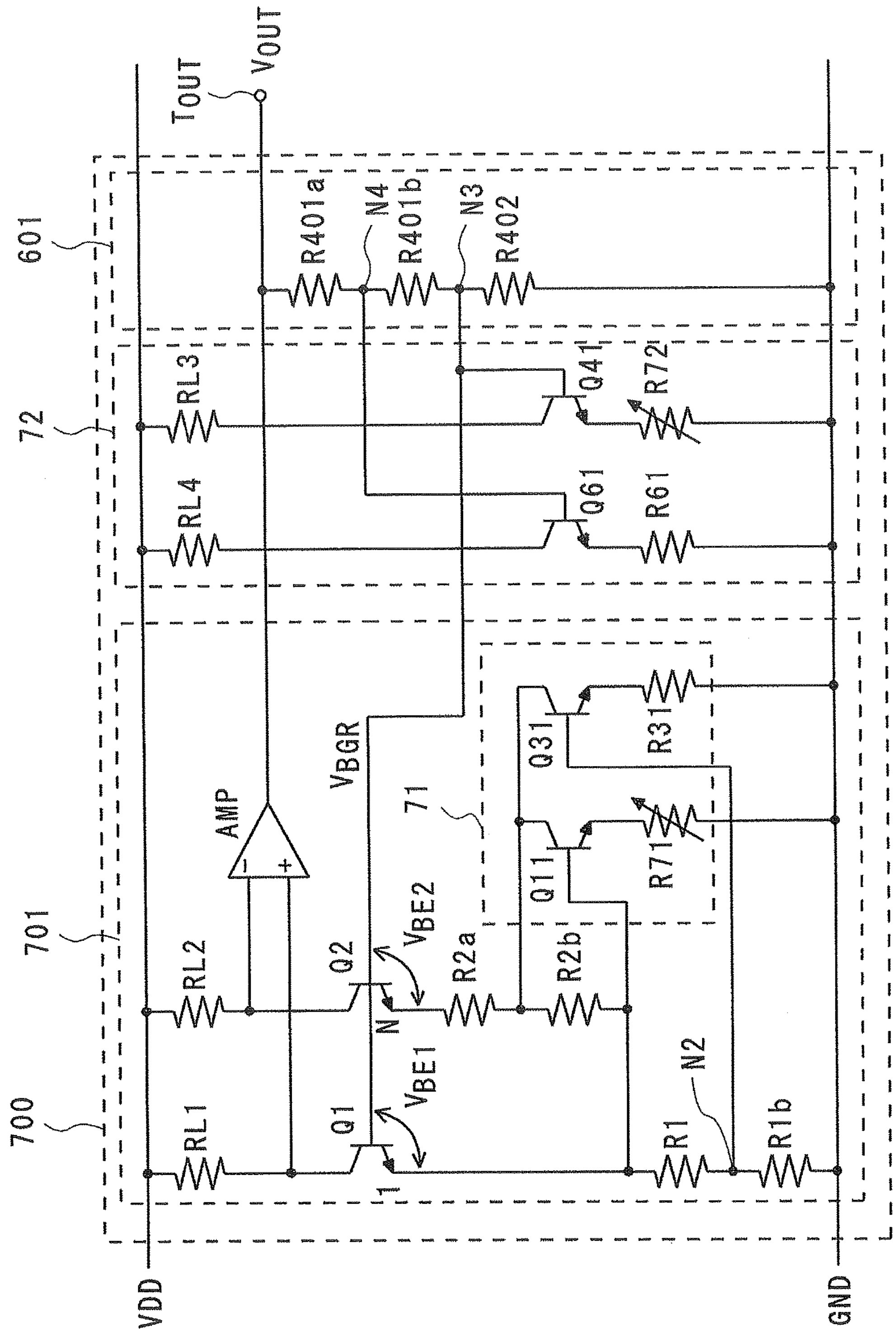
FIG. 18 is a circuit diagram showing a configuration of a power supply circuit 700 according to a seventh embodiment.

Next, a power supply circuit 700 according to a seventh embodiment will be described. FIG. 18 is a circuit diagram showing a configuration of the power supply circuit 700 according to the seventh embodiment. The power supply circuit 700 includes a BGR circuit 701, a temperature correction circuit 72, and a booster unit 601. Since the booster unit 601 is similar to that in the power supply circuit 600, description thereof will be omitted. The BGR circuit 701 has a configuration in which the temperature correction circuit 30 of the BGR circuit 300 according to the third embodiment is replaced with a temperature correction circuit 71. The temperature correction circuit 71 has a configuration in which the resistor R11 of the temperature correction circuit 30 is replaced with a variable resistor R71. The temperature correction circuit 72 has a configuration in which the resistor R41 of the temperature correction circuit 60 according to the sixth embodiment is replaced with a variable resistor R72.

The BGR circuit 701 supplies a control signal from an external control circuit to the variable resistor R71, for example, thereby being able to set the resistance value of the variable resistor R71. Accordingly, it is possible to adjust the temperature characteristics of the BGR circuit without performing physical processing including laser trimming as in the BGR circuit 100 according to the first embodiment.

Further, the temperature correction circuit 72 supplies the control signal from the external control circuit to the variable resistor R72, for example, thereby being able to set the resistance value of the variable resistor R72. Accordingly, it is possible to adjust the temperature characteristics of the power supply circuit without performing physical processing including laser trimming as in the power supply circuit 400 according to the fourth embodiment.

In summary, according to this configuration, it is possible to adjust temperature characteristics on the lower temperature side and the higher temperature side than the temperature Ts by the external control signal or the like. Accordingly, it is possible to preferably correct the output voltage in a wider temperature range compared to the BGR circuit according to the first to third embodiments and the power supply circuit according to the fourth to sixth embodiments.

Eighth Embodiment

Figure 19:
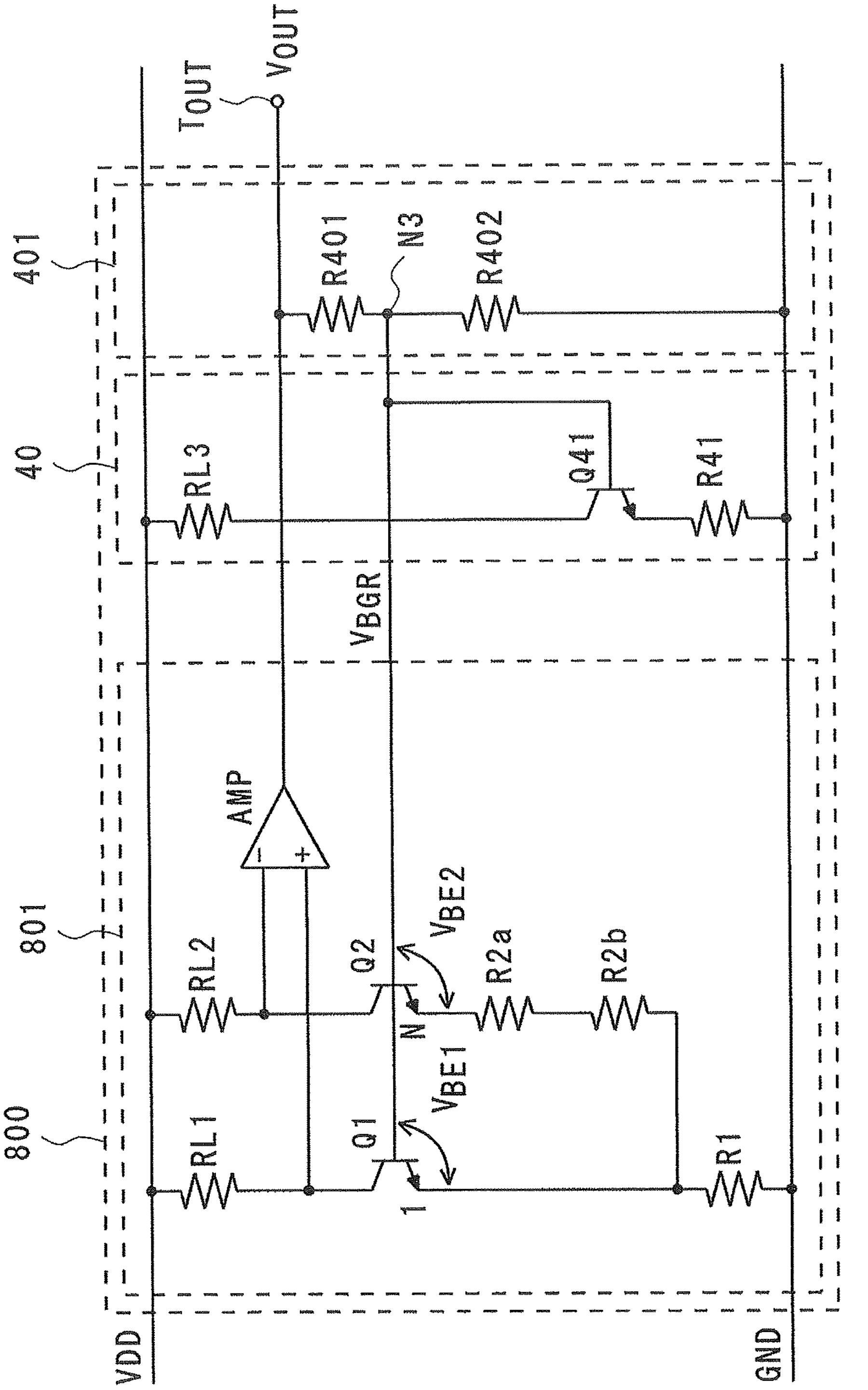
FIG. 19 is a circuit diagram showing a configuration of a power supply circuit 800 according to an eighth embodiment.

Next, a power supply circuit 800 according to an eighth embodiment will be described. FIG. 19 is a circuit diagram showing a configuration of the power supply circuit 800 according to the eighth embodiment. The power supply circuit 800 includes a BGR circuit 801, a temperature correction circuit 40, and a booster unit 401. Since the temperature correction circuit 40 and the booster unit 401 are similar to those of the power supply circuit 400, description thereof will be omitted. Further, the BGR circuit 801 has a configuration in which the temperature correction circuit 10 is removed from the BGR circuit 100 according to the first embodiment. The BGR circuit 801 has the similar configuration as the equivalent circuit shown in FIG. 5, and has the similar configuration as the BGR circuit 1100 shown in FIG. 24. Therefore, description of the circuit configuration and the operation of the BGR circuit 801 will be omitted. In other words, the power supply circuit 800 has a configuration in which the temperature correction circuit 10 is removed from the power supply circuit 400.

Figure 20:
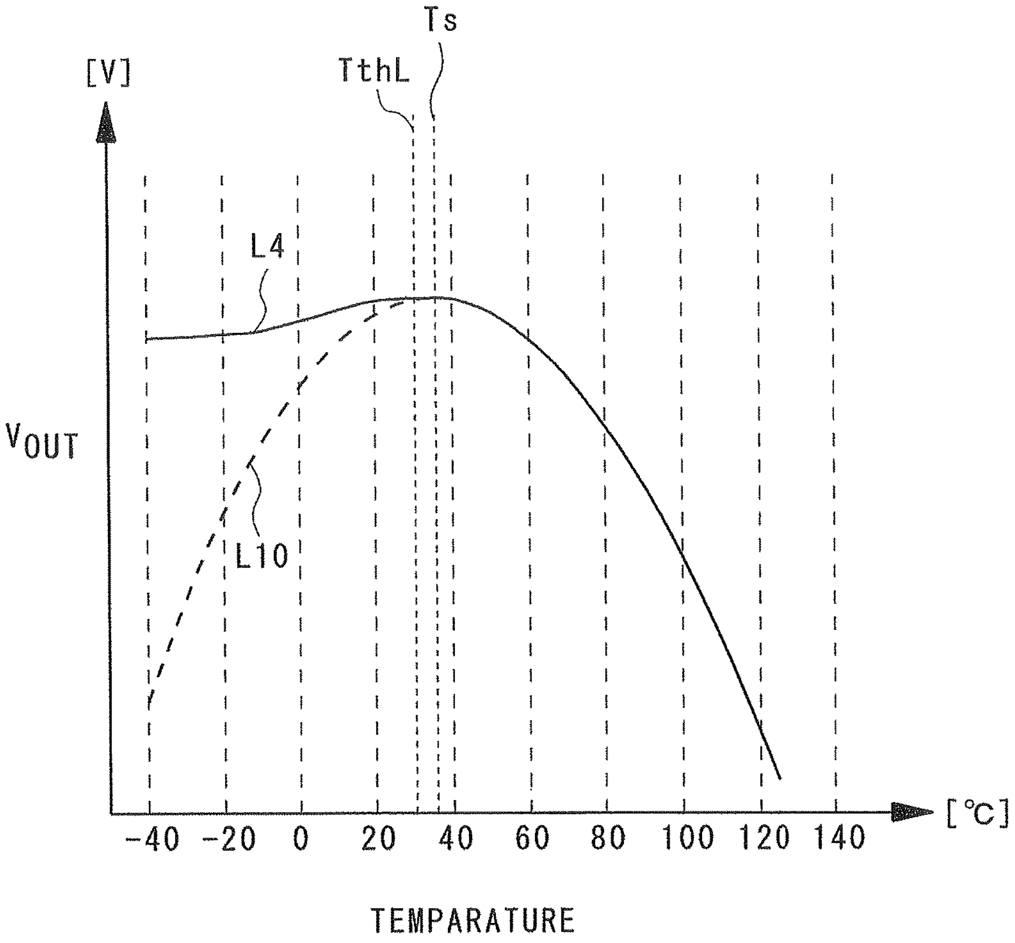
FIG. 20 is a graph showing temperature characteristics of an output voltage $V_{OUT}$ of the power supply circuit 800 according to the eighth embodiment.

FIG. 20 is a graph showing temperature characteristics of the output voltage $V_{OUT}$ of the power supply circuit 800 according to the eighth embodiment. The power supply circuit 800 is able to suppress voltage decrease and to suppress fluctuations in the output voltage $V_{OUT}$ when the output voltage $V_{OUT}$ decreases with decreasing temperature in a temperature range which is on the lower temperature side than the temperature Ts.

Ninth Embodiment

Figure 21:
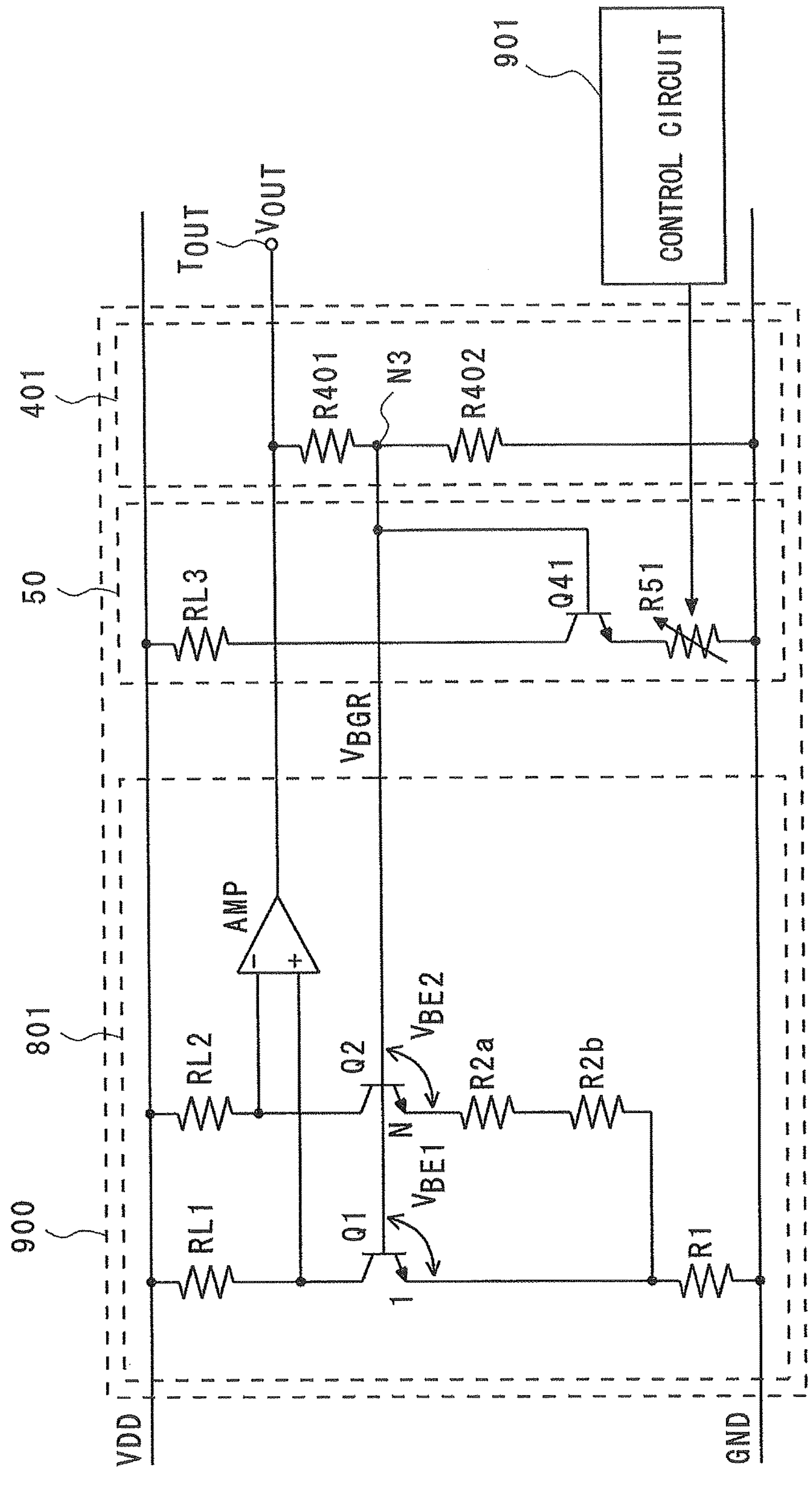
FIG. 21 is a circuit diagram showing a configuration of a power supply circuit 900 according to a ninth embodiment.

Next, a power supply circuit 900 according to a ninth embodiment will be described. FIG. 21 is a circuit diagram showing a configuration of the power supply circuit 900 according to the ninth embodiment. The power supply circuit 900 includes a BGR circuit 801, a temperature correction circuit 50, and a booster unit 401. Since the temperature correction circuit 50 and the booster unit 401 are similar to those in the power supply circuit 500, description thereof will be omitted. Further, as described in the eighth embodiment, the BGR circuit 801 has a configuration in which the temperature correction circuit 10 is removed from the BGR circuit 100 according to the first embodiment. In other words, the power supply circuit 900 has a configuration in which the temperature correction circuit 10 is removed from the power supply circuit 500.

The power supply circuit 900 supplies a control signal from an external control circuit 901 to the variable resistor R51, for example, thereby being able to set the resistance value of the variable resistor R51. Therefore, it is possible to adjust the temperature characteristics of the power supply circuit without performing physical processing including laser trimming as in the power supply circuit 400 according to the fourth embodiment.

Tenth Embodiment

Figure 22:
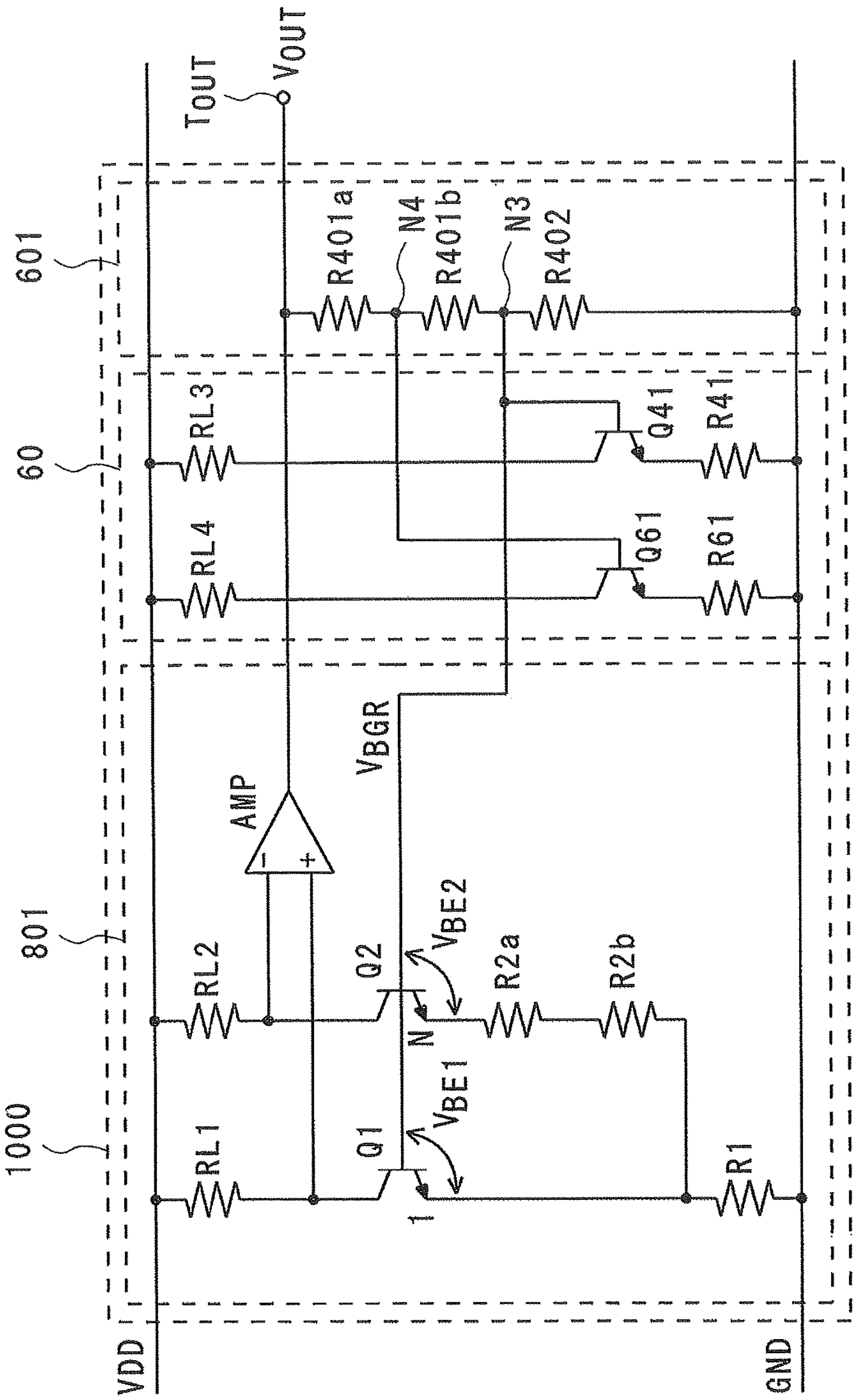
FIG. 22 is a circuit diagram showing a configuration of a power supply circuit 1000 according to a tenth embodiment.

Next, a power supply circuit 1000 according to a tenth embodiment will be omitted. FIG. 22 is a circuit diagram showing a configuration of the power supply circuit 1000 according to the tenth embodiment. The power supply circuit 1000 includes a BGR circuit 801, a temperature correction circuit 60, and a booster unit 601. Since the temperature correction circuit 60 and the booster unit 601 are similar to those in the power supply circuit 600, description thereof will be omitted. Further, as described in the eighth embodiment, the BGR circuit 801 has a configuration in which the temperature correction circuit 10 is removed from the BGR circuit 100 according to the first embodiment. In other words, the power supply circuit 1000 has a configuration in which the temperature correction circuit 10 is removed from the power supply circuit 600.

Figure 23:
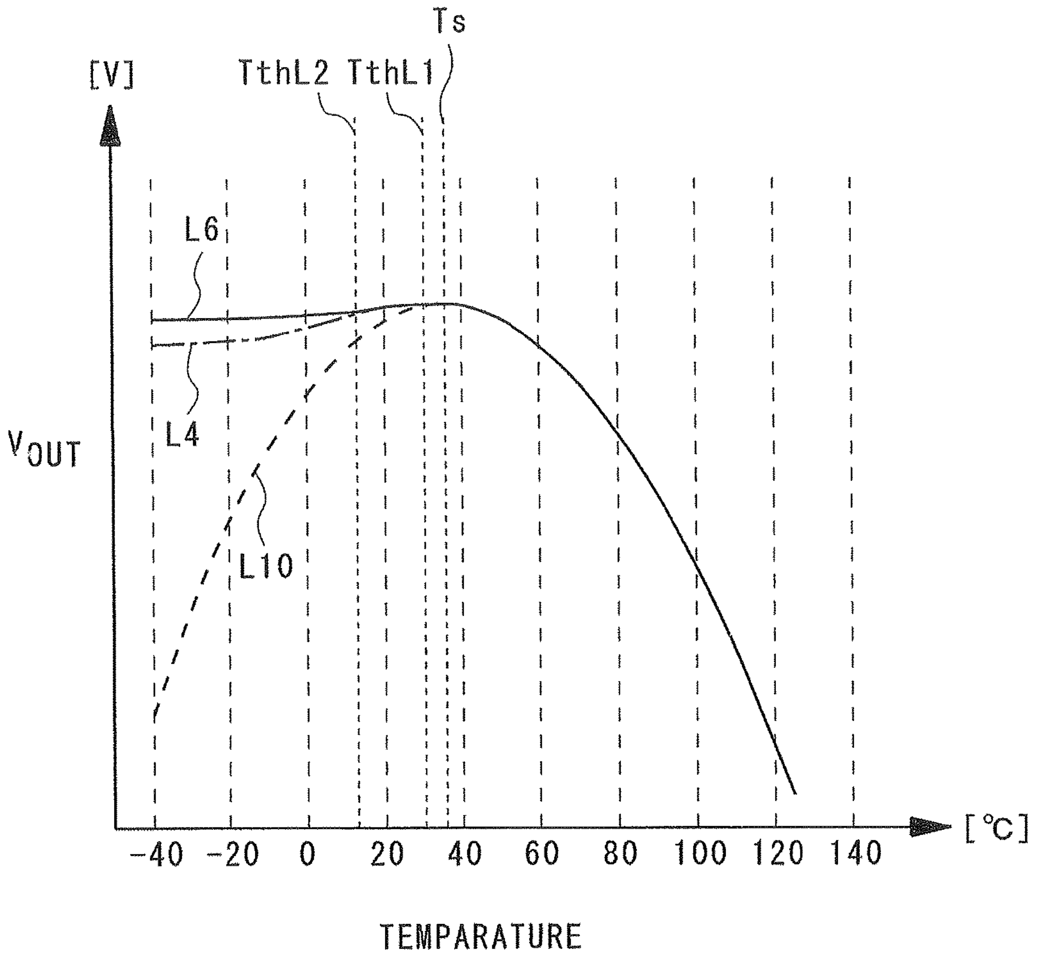
FIG. 23 is a graph showing temperature characteristics of an output voltage $V_{OUT}$ of the power supply circuit 1000 according to the tenth embodiment.

FIG. 23 is a graph showing temperature characteristics of the output voltage $V_{OUT}$ of the power supply circuit 1000 according to the tenth embodiment. In summary, even when the decrease rate of the output voltage increases with decreasing temperature, the power supply circuit 1000 is able to further suppress decrease in the output voltage $V_{OUT}$ by using a plurality of transistors that are turned on at different temperatures. This embodiment has been described taking the case as an example in which the temperature correction circuit 60 includes two transistors connected in parallel. However, the temperature correction circuit 60 may include three or more transistors.

Other Embodiments

The present invention is not limited to the embodiments stated above, but may be changed as appropriate without departing from the spirit of the present invention. For example, while the BGR circuit 100 has been used in the above fourth to sixth embodiments, the BGR circuit 200 or 300 may be used instead.

The resistor R31 of the temperature correction circuit 30 is a fixed resistor in the BGR circuit 300 according to the third embodiment. However, the resistor R31 may be a variable resistor. Further, the resistor R11 of the temperature correction circuit 30 may be replaced with the variable resistor R21 as is similar to the temperature correction circuit 20. Further, while the resistor R61 of the temperature correction circuit 60 is a fixed resistor in the power supply circuits 600 and 1000 according to the sixth and tenth embodiments, it may be a variable resistor. Further, the resistor R41 of the temperature correction circuit 60 may be replaced with the variable resistor R51 as is similar to the temperature correction circuit 50. Further, the resistor R31 of the temperature correction circuit 71 according to the seventh embodiment may be a variable resistor. The resistor R61 of the temperature correction circuit 72 according to the seventh embodiment may be a variable resistor.

In the embodiments stated above, the resistance values of the resistors R1, R1*a*, R1*b*, R2*a*, and R2*b* of the BGR circuit are merely examples, and may have other values. Further, the resistance values of the booster resistors R401, R401*a*, and R401*b* of the booster units 401 and 601 are merely examples, and may have other values.

The transistors Q11 and Q31 may either be bipolar transistors or MOS transistors.

Further, the BGR circuit and the power supply circuit described in the embodiments stated above are not necessarily applied to the voltage monitoring system of the assembled battery of the electric vehicle or hybrid car. For example, they may be applied to equipment and an apparatus in which a secondary battery such as a lithium-ion battery is installed. For example, the BGR circuit and the power supply circuit according to the embodiments stated above may also be applied to mobile telephones, portable audio players, or home storage batteries for the purpose of supplying power to houses.

The first to tenth embodiments can be combined as desirable by one of ordinary skill in the art.)

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A band gap reference circuit comprising:

a first bipolar transistor and a second bipolar transistor that are coupled to a first power supply terminal and a second power supply terminal, each base of the first bipolar transistor and the second bipolar transistor being coupled to an output terminal;

a first resistor that is coupled to the second power supply terminal and the first bipolar transistor;

a second resistor and a third resistor that are coupled to an end of the first bipolar transistor and the first resistor together and the second bipolar transistor in series;

a ninth resistor that is coupled to the first power supply terminal and a collector of the first bipolar transistor;

a tenth resistor that is coupled to the first power supply terminal and a collector of the second bipolar transistor;

an amplifier is coupled to the collector of the first bipolar transistor via a non-inverting input terminal, to the collector of the second bipolar transistor via an inverting input terminal, and outputs to the output terminal; and a first temperature correction circuit that is coupled to the second power supply terminal, a first node between the third resistor and the first resistor, and a second node between the second resistor and the third resistor.

2. The band gap reference circuit according to claim 1, wherein the first temperature correction circuit comprising:

a first transistor that is coupled to the second node via a collector of the first transistor, and to the first node via a base of the first transistor; and a fourth resistor that is coupled to an emitter of the first transistor and the second power supply terminal.

3. The band gap reference circuit according to claim 2, further comprising:

a first control circuit that controls a value of the fourth resistance, wherein the fourth resistor is a variable resistance.

4. The band gap reference circuit according to claim 2, further comprising:

a fifth resistor is coupled to the first resistor and the second power supply terminal; wherein the first temperature correction circuit comprising:

a second transistor is coupled to the second node via a collector of the second transistor and a node between the first resistor and the fifth resistor via a base of the second transistor; and a sixth resistor is coupled to an emitter of the second transistor and the second power supply terminal.

5. A power supply circuit comprising:

the band gap reference circuit according to claim 1;

a second temperature correction circuit and a booster that are coupled to the band gap reference circuit and the output terminal; wherein the booster comprising:

a first boost resister is coupled to each of a base of the first and the second bipolar transistor and the output terminal;

a second boost resistor is coupled to each of the first and the second bipolar transistor and the second power supply terminal; wherein the second temperature correction circuit comprising:

a third bipolar transistor that is coupled to the first power supply terminal and the second power supply terminal, and is coupled to the first boost resistor and the second boost resistor via a base; and a seventh resistor that is coupled to the third bipolar transistor, in serial, between the first power supply terminal and the second power supply terminal.

6. The band gap reference circuit according to claim 5, further comprising:

a second control circuit that controls a value of the seventh resistance, wherein the seventh resistor is a variable resistance.

7. The power supply circuit according to claim 5 further comprising:

a third boost resistor is coupled to the first boost resistor and the output terminal; wherein the second temperature correction circuit comprising:

a fourth bipolar transistor that is coupled to the first power supply terminal and the second power supply terminal, and is coupled to the first boost resistor and the third boost resistor; and an eighth resistor is coupled to the forth bipolar transistor in serial between the first power supply terminal and the second power supply terminal.

8. The power supply circuit according to claim 7, wherein the first temperature correction circuit comprising:

a first transistor that is coupled to the second node via a collector of the first transistor, and to the first node via a base of the first transistor; and a fourth resistor that is coupled to an emitter of the first transistor and the second power supply terminal, wherein the fourth resistor and the eighth resistor are variable resistors.

9. The band gap reference circuit according to claim 1, wherein the first temperature correction circuit is controlled via a control electrode that is coupled to the first node between the third resistor and the first resistor.

10. The band gap reference circuit according to claim 1, wherein the first temperature correction circuit comprises a first transistor including a control electrode that is coupled to the first node.

11. The band gap reference circuit according to claim 1, wherein the first temperature correction circuit is coupled to the second power supply terminal, directly coupled to the first node between the third resistor and the first resistor, and coupled to the second node between the second resistor and the third resistor.

12. A power supply circuit comprising:

a band gap reference circuit;

a second temperature correction circuit and a booster that are coupled to the band gap reference circuit and an output terminal; wherein the band gap reference circuit comprising:

a first and a second bipolar transistor are coupled to a first and a second power supply terminal, and are coupled to the output terminal via a base of each of the first and the second bipolar transistors ;

a first resistor is coupled to the second power supply terminal and the first bipolar transistor;

a second and a third resistors that are coupled to an end of the first bipolar transistor the first resistor together and the second bipolar transistor in series;

a ninth resistor that is coupled to the first power supply terminal and a collector of the first bipolar transistor;

a tenth resistor that is coupled to the first power supply terminal and a collector of the second bipolar transistor; and an amplifier is coupled to the collector of the first bipolar transistor via a non-inverting input terminal, to the collector of the second bipolar transistor via an inverting input terminal, and outputs to the output terminal; wherein the booster comprising:

a first boost resistor is coupled to each of a base of the first and the second bipolar transistor and the output terminal;

a second boost resistor is coupled to each of the first and the second bipolar transistor and the second power supply terminal; wherein the second temperature correction circuit comprising:

a third bipolar transistor that is coupled to the first power supply terminal and the second power supply terminal, and is coupled to the first boost resistor and the second boost resistor via a base; and a seventh resistor that is coupled to the third bipolar transistor, in serial, between the first power supply terminal and the second power supply terminal.

13. The power supply circuit according to claim 12, further comprising:

a second control circuit that controls a value of the seventh resistance; wherein the seventh resistor is a variable resistance.

14. The power supply circuit according to claim 12 further comprising:

a third boost resistor is coupled to the first boost resistor and the output terminal; wherein the second temperature correction circuit comprises:

a fourth bipolar transistor that is coupled to the first power supply terminal and the second power supply terminal, and a base terminal of the fourth bipolar transistor is coupled to the first boost resistor and the third boost resistor; and an eighth resistor is coupled to the forth bipolar transistor in serial between the first power supply terminal and the second power supply terminal.

15. A band gap reference circuit comprising:

a first transistor and a second transistor that are coupled to a first power supply terminal. and a second power supply terminal, each base of the first transistor and the second transistor being coupled to an output terminal;

a first resistor that is coupled to the second power supply terminal and the first transistor;

a second resistor and a third resistor that are coupled to an end of the first transistor and the first resistor together and the second transistor in series;

a ninth resistor that is coupled to the first power supply terminal and a collector of the first transistor;

a tenth resistor that is coupled to the first power supply terminal and a collector of the second transistor;

an amplifier is coupled to the collector of the first transistor via a non-inverting. input terminal, to the collector of the second transistor via an inverting input terminal, and outputs to the output terminal; and a first temperature correction circuit that is coupled to the second power supply terminal, a first node between the third resistor and the first resistor, and a second node between the second resistor and the third resistor.

16. The band gap reference circuit according to claim 15, wherein the first temperature correction circuit is controlled via a control electrode that is coupled to the first node between the third resistor and the first resistor.

17. The band gap reference circuit according to claim 15, wherein the first temperature correction circuit comprises a third transistor including a control electrode that is coupled to the first node.

18. The band gap reference circuit according to claim 15, wherein the first temperature correction circuit comprises a third transistor including a control electrode that is controlled via a signal from the first node.

19. The band gap reference circuit according to claim 15, wherein the first temperature correction circuit comprising:

a third transistor that is coupled to the second node via a collector of the first transistor, and to the first node via a control electrode of the first transistor; and a fourth resistor that is coupled to an emitter of the third transistor and the second power supply terminal.

20. A power supply circuit comprising:

gap reference circuit according to claim 15; and a second temperature correction circuit and a booster that are coupled to the band gap reference circuit and the output terminal.

* * * * *